(12) United States Patent
Noguchi et al.

(10) Patent No.: US 11,061,506 B2
(45) Date of Patent: Jul. 13, 2021

(54) DETECTION APPARATUS AND DISPLAY APPARATUS

(71) Applicant: Japan Display Inc., Tokyo (JP)

(72) Inventors: Koji Noguchi, Tokyo (JP); Koji Ishizaki, Tokyo (JP); Hayato Kurasawa, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 16/831,295

(22) Filed: Mar. 26, 2020

(65) Prior Publication Data

US 2020/0225802 A1 Jul. 16, 2020

Related U.S. Application Data

(63) Continuation of application No. 15/787,142, filed on Oct. 18, 2017, now Pat. No. 10,620,743.

(30) Foreign Application Priority Data

Oct. 21, 2016 (JP) .............................. JP2016-206863
Nov. 9, 2016 (JP) .............................. JP2016-218802

(51) Int. Cl.
*G06F 3/041* (2006.01)
*G06F 3/044* (2006.01)
(Continued)

(52) U.S. Cl.
CPC ........... *G06F 3/04164* (2019.05); *G01D 5/24* (2013.01); *G02F 1/13338* (2013.01);
(Continued)

(58) Field of Classification Search
CPC .... G06F 3/0416; G06F 3/03547; G06F 3/044; G06F 2203/04103; G06F 2203/04112; G01D 5/24
See application file for complete search history.

(56) References Cited

U.S. PATENT DOCUMENTS 10,216,348 B2   2/2019   Koito et al.
2010/0033443 A1*  2/2010   Hashimoto ............. G06F 3/044
                                                    345/173
(Continued)

FOREIGN PATENT DOCUMENTS

JP    2010-039816 A    2/2010
JP    U3183453         4/2013
(Continued)

OTHER PUBLICATIONS

Japanese Office Action dated Feb. 25, 2020 in related Japanese Patent Application No. 2016-218802 and machine translation of same. 5 pages.

(Continued)

*Primary Examiner* — Kenneth B Lee, Jr.
(74) *Attorney, Agent, or Firm* — K&L Gates LLP

(57) ABSTRACT

A detection apparatus includes a substrate, a display area, a peripheral area, a plurality of electrodes, a plurality of terminals, a first wire, and a second wire. The display area is provided on the surface of the substrate. The peripheral area is provided outside the display area. The electrodes are provided to the display area. The terminals are provided in correspondence with the respective electrodes in the peripheral area. The first wire couples an electrode to a terminal. The second wire couples the electrode to the terminal to which the first wire is coupled.

18 Claims, 32 Drawing Sheets

(51) Int. Cl.
   *G01D 5/24* (2006.01)
   *G02F 1/1333* (2006.01)
   *G06F 3/0354* (2013.01)

(52) U.S. Cl.
   CPC ........ *G06F 3/03547* (2013.01); *G06F 3/0445* (2019.05); *G06F 3/0446* (2019.05); *G06F 3/04166* (2019.05); *G06F 2203/04103* (2013.01); *G06F 2203/04112* (2013.01)

(56) References Cited

U.S. PATENT DOCUMENTS

| | | |
|---|---|---|
| 2014/0043292 A1 | 2/2014 | Hashimoto |
| 2014/0192274 A1 | 4/2014 | Nakano |
| 2014/0292710 A1 | 10/2014 | Koito et al. |
| 2015/0169109 A1 | 6/2015 | Park |
| 2015/0177888 A1 | 6/2015 | Hashimoto |
| 2016/0147374 A1 | 5/2016 | Hashimoto |
| 2016/0291723 A1 | 10/2016 | Kurasawa et al. |
| 2017/0010719 A1* | 1/2017 | Chen ............... G06F 3/0445 |
| 2017/0102819 A1 | 4/2017 | Hashimoto |

FOREIGN PATENT DOCUMENTS

| | | |
|---|---|---|
| JP | 2013-210938 A | 10/2013 |
| JP | 2014-191661 A | 10/2014 |
| JP | 2016-095615 A | 5/2016 |
| JP | 2016-099315 A | 5/2016 |

OTHER PUBLICATIONS

Chinese Office Action dated Jun. 17, 2020 in related Chinese Patent Application No. 2017109813788 and machine translation of same. 32 pages.

Japanese Office Action dated Apr. 6, 2021 in related Japanese Patent Application No. 2020-107573 and machine translation of same. 6 pages.

* cited by examiner

FIG.31

| (TABLE) | STANDARD | | ACTUAL VALUE | | DETERMINATION | |
|---|---|---|---|---|---|---|
| | UPPER LIMIT (kΩ) | ΔR | UPPER LIMIT (kΩ) | ΔR | UPPER LIMIT | ΔR |
| TERMINAL (1) | $a_1$ | $b_1$ | $c_1$ | $d_1$ | OK | OK |
| TERMINAL (2) | $a_2$ | $b_2$ | $c_2$ | $d_2$ | OK | NG |
| ... | ... | ... | ... | ... | ... | ... |
| TERMINAL (n) | $a_n$ | $b_n$ | $c_n$ | $d_n$ | NG | OK |

DETECTION APPARATUS AND DISPLAY APPARATUS

CROSS-REFERENCE TO RELATED APPLICATIONS

This application is a continuation of U.S. application Ser. No. 15/787,142, filed Oct. 18, 2017, which application claims priority from Japanese Application No. 2016-206863, filed on Oct. 21, 2016 and Japanese Application No. 2016-218802, filed on Nov. 9, 2016, the contents of which are incorporated by reference herein in its entirety.

BACKGROUND

1. Technical Field

The present disclosure relates to a detection apparatus and a display apparatus.

2. Description of the Related Art

Touch detection apparatuses capable of detecting an external proximity object, what are called touch panels, have recently been attracting attention. Touch panels are mounted on or integrated with a display apparatus, such as a liquid crystal display apparatus, and used as display apparatuses with a touch detection function. Detection electrodes and drive electrodes of the touch panels are coupled to terminals via wires. The terminals are coupled to a flexible substrate. The wires may possibly be broken due to a small width. By coupling wires to both ends of the detection electrodes (refer to Japanese Patent Application Laid-open Publication No. 2010-39816 (JP-A-2010-39816), for example), coupling of the detection electrodes to the flexible substrate can be secured with one of the wires even when the other thereof is broken.

As described in JP-A-2010-39816 however, an increase in the number of wires coupled to the detection electrodes and the drive electrodes increases the number of terminals that couple the wires to the flexible substrate. In addition, a plurality of wires coupled to one electrode need to be electrically coupled in the flexible substrate. With this configuration, a multilayered flexible substrate is required, and the wires are coupled in a grade separation manner in the flexible substrate. As a result, the cost may possibly increase.

SUMMARY

A detection apparatus according to one aspect includes a substrate, a display area, a peripheral area provided outside the display area, a plurality of electrodes provided to the display area and on a surface of the substrate, a plurality of terminals provided in correspondence with the respective electrodes in the peripheral area, a first wire that couples a respective electrode of the electrodes to a respective terminal of the terminals, and a second wire that couples the respective electrode to the respective terminal to which the first wire is coupled.

A detection apparatus according to one aspect includes a substrate, a display area, a peripheral area provided outside the display area, a plurality of electrodes provided to the display area and on a surface of the substrate, first terminals and second terminals provided in correspondence with the respective electrodes in the peripheral area, a first wire that couples a respective electrode of the plurality of electrodes to one of the first terminals, and a second wire that couples the respective electrode to one of the second terminals. The first terminals are arrayed in a first direction, and the second terminals are arranged facing the first terminals in a second direction intersecting with the first direction.

A display apparatus according to one aspect includes any one of the detection apparatus described above and a display functional layer that displays an image on the display area.

BRIEF DESCRIPTION OF THE DRAWINGS

FIG. 31 is a table of an example of resistance inspection items and determination results;

DETAILED DESCRIPTION

Figure 1:
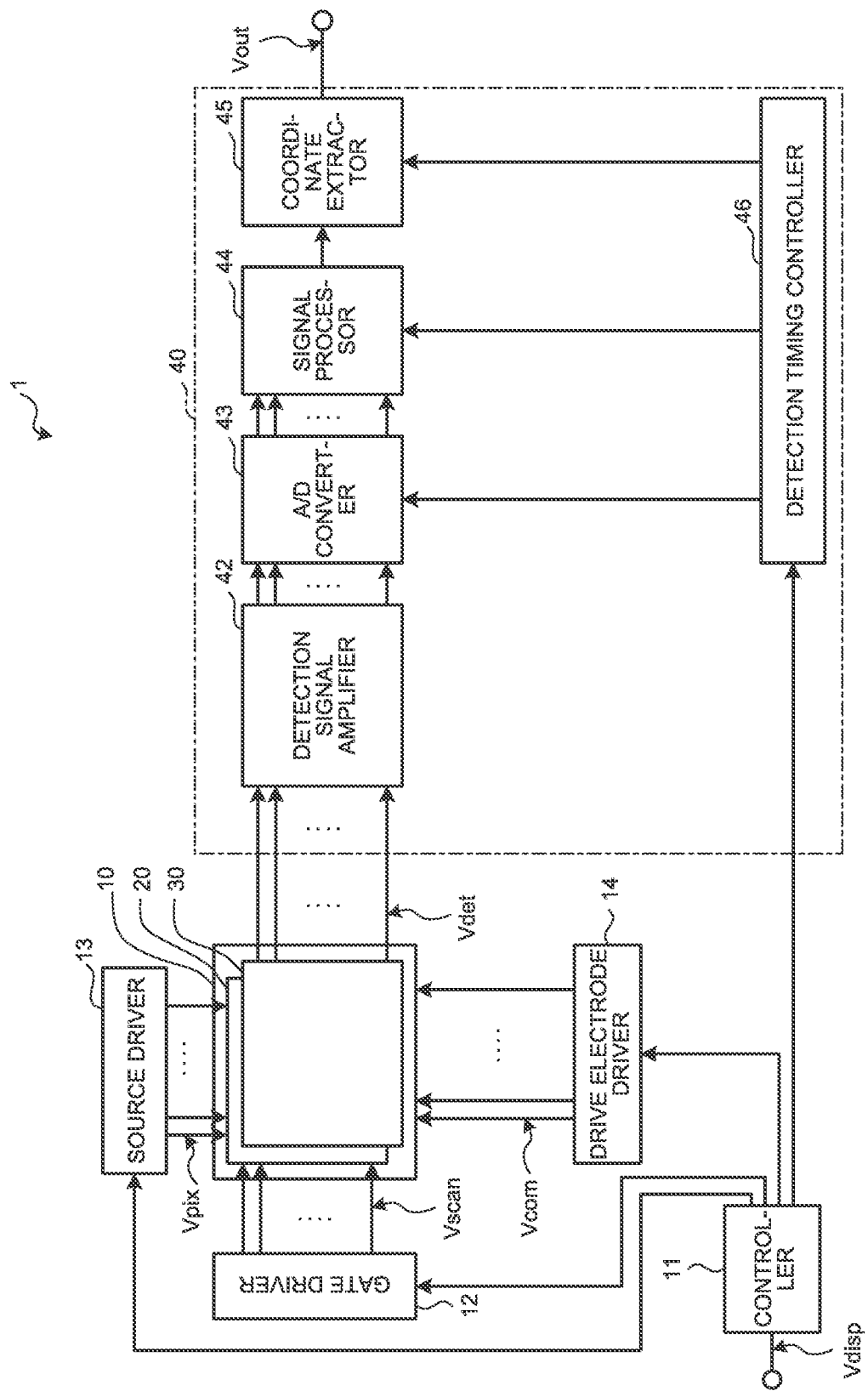
FIG. 1 is a block diagram of an exemplary configuration of a display apparatus according to a first embodiment of the present invention.

Exemplary aspects (embodiments) to embody the present invention are described below in greater detail with reference to the accompanying drawings. The contents described in the embodiments are not intended to limit the present invention. Components described below include components easily conceivable by those skilled in the art and components substantially identical therewith. Furthermore, the components described below may be appropriately combined. The disclosure is given by way of example only, and appropriate modifications made without departing from the spirit of the invention and easily conceivable by those skilled in the art naturally fall within the scope of the invention. To simplify the explanation, the drawings may possibly illustrate the width, the thickness, the shape, and other elements of each unit more schematically than the actual aspect. These elements, however, are given by way of example only and are not intended to limit interpretation of the invention. In the specification and the drawings, components similar to those previously described with reference to previous drawings are denoted by like reference numerals, and overlapping explanation thereof may be appropriately omitted.

First Embodiment

FIG. 1 is a block diagram of an exemplary configuration of a display apparatus according to a first embodiment of the present invention. A display apparatus 1 includes a display device with a touch detection function 10, a controller 11, a gate driver 12, a source driver 13, a drive electrode driver 14, and a detection device 40. The display device with a touch detection function 10 is an apparatus in which a display panel 20 what is called a liquid crystal display apparatus is integrated with a capacitance detection apparatus 30. The display device with a touch detection function 10 may be an apparatus in which the detection apparatus 30 is mounted on the display panel 20. The display panel 20 may be an organic electroluminescence (EL) display apparatus, for example. The gate driver 12, the source driver 13, or the drive electrode driver 14 may be provided to the display device with a touch detection function 10.

The display panel 20 is an apparatus that sequentially scans each horizontal line to perform display based on scanning signals Vscan supplied from the gate driver 12. The controller 11 is a circuit (control apparatus) that supplies control signals to the gate driver 12, the source driver 13, the drive electrode driver 14, and the detection device 40 based on video signals Vdisp supplied from the outside, thereby performing control such that these components operate synchronously with one another.

The gate driver 12 has a function to sequentially select one horizontal line to be a target of display drive in the display device with a touch detection function 10 based on the control signals supplied from the controller 11.

The source driver 13 is a circuit that supplies pixel signals Vpix to respective sub-pixels SPix of the display device with a touch detection function 10 based on the control signals supplied from the controller 11.

The drive electrode driver 14 is a circuit that supplies drive signals Vcom to drive electrodes COML of the display device with a touch detection function 10 based on the control signals supplied from the controller 11.

The detection device 40 is a circuit that determines whether a touch (a contact or proximity state, which will be described later) is made on the detection apparatus 30 based on the control signals supplied from the controller 11 and detection signals Vdet supplied from the detection apparatus 30 of the display device with a touch detection function 10. If a touch is detected, the detection device 40 calculates coordinates of the touch in a touch detection area. The detection device 40 includes a detection signal amplifier 42, an analog/digital (A/D) converter 43, a signal processor 44, a coordinate extractor 45, and a detection timing controller 46.

The detection signal amplifier 42 amplifies the detection signals Vdet supplied from the detection apparatus 30. The detection signal amplifier 42 may include a low-pass analog filter that removes high-frequency components (noise components) included in the detection signals Vdet and extracts and outputs touch components.

Basic Principle of Capacitance Touch Detection

Figure 2:
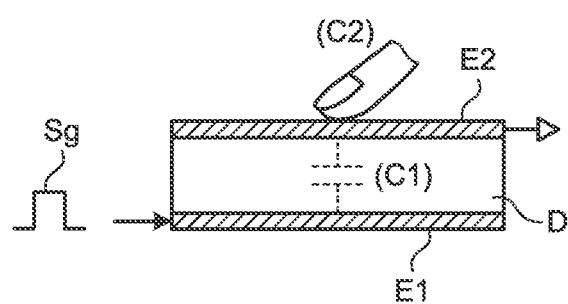
FIG. 2 is a diagram for explaining the basic principle of a mutual capacitance type capacitance touch detection method.
Figure 3:
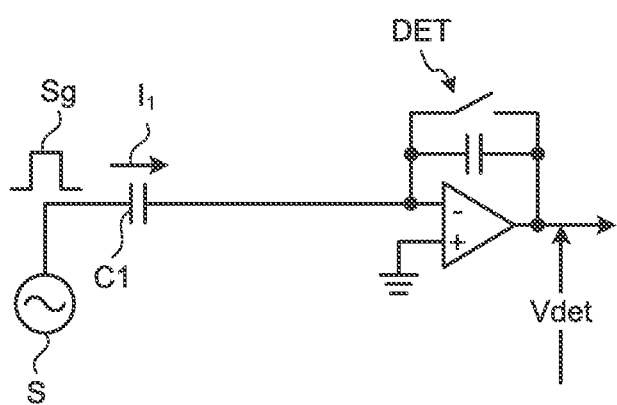
FIG. 3 is a diagram of an example of an equivalent circuit for explaining the basic principle of the mutual capacitance type capacitance touch detection method.
Figure 4:
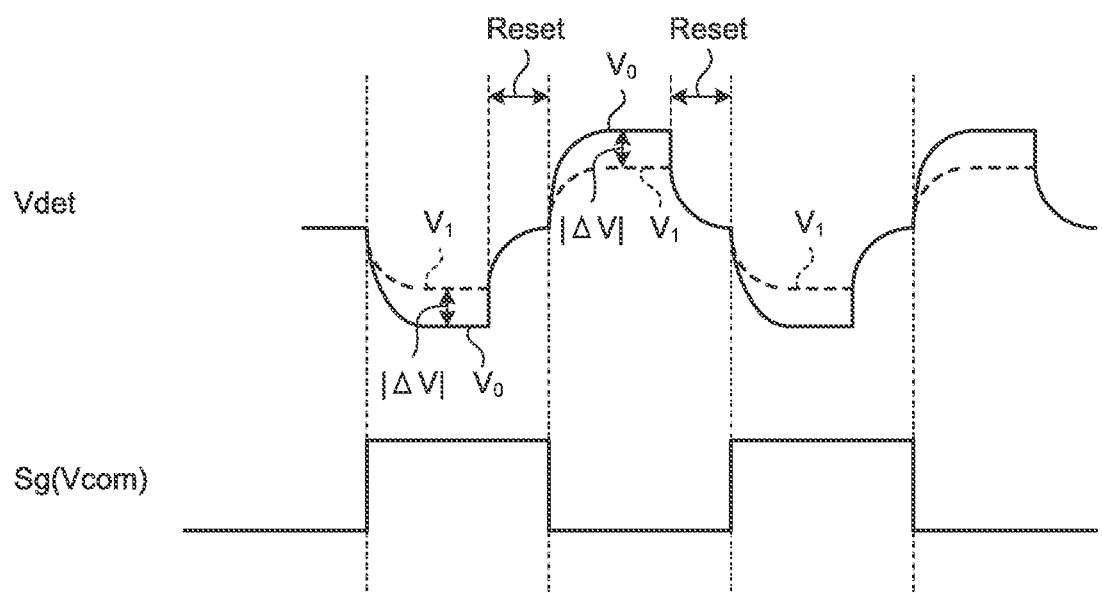
FIG. 4 is a diagram of an example of waveforms of a drive signal and a detection signal.

The detection apparatus 30 operates based on the basic principle of capacitance proximity detection and outputs the detection signals Vdet. The following describes the basic principle of touch detection performed by the display device with a touch detection function 10 according to the present embodiment with reference to FIGS. 1 to 4. FIG. 2 is a diagram for explaining the basic principle of a mutual capacitance type (mutual type) capacitance touch detection method. FIG. 3 is a diagram of an example of an equivalent circuit for explaining the basic principle of the mutual capacitance type capacitance touch detection method. FIG. 4 is a diagram of an example of waveforms of a drive signal and a detection signal. An external object may be any object as long as it generates capacitance. Examples of the external object include, but are not limited to, a finger, a stylus, etc. The present embodiment describes a case where the external object is a finger, for example.

As illustrated in FIG. 2, for example, a capacitance element C1 includes a pair of electrodes, that is, a drive electrode E1 and a detection electrode E2 facing each other with a dielectric D interposed therebetween. As illustrated in FIG. 3, a first end of the capacitance element C1 is coupled to an alternating-current (AC) signal source (drive signal source) S, and a second end thereof is coupled to a voltage detector (detection device) DET. The voltage detector DET is an integration circuit included in the detection signal amplifier 42 illustrated in FIG. 1, for example.

When the AC signal source S applies an AC rectangular wave Sg at a predetermined frequency (e.g., approximately several kilohertz to several hundred kilohertz) to the drive electrode E1 (first end of the capacitance element C1), an output waveform (detection signal Vdet) is generated via the voltage detector DET.

In a state where a finger is not in contact with (or in proximity to) the detection electrode (hereinafter, referred to as a "non-contact state"), an electric current depending on the capacitance value of the capacitance element C1 flows in association with charge and discharge of the capacitance element C1. The voltage detector DET converts fluctuations in the electric current depending on the AC rectangular wave Sg into fluctuations in the voltage (waveform $V_0$ indicated by the solid line (refer to FIG. 4)).

By contrast, in a state where a finger is in contact with (or in proximity to) the detection electrode (hereinafter, referred to as a "contact state"), capacitance C2 generated by the finger is in contact with or in proximity to the detection electrode E2 as illustrated in FIG. 2. In this state, fringe capacitance between the drive electrode E1 and the detection electrode E2 is blocked. As a result, the capacitance element C1 acts as a capacitance element having a capacitance value smaller than that in the non-contact state. The voltage detector DET converts fluctuations in an electric current $I_1$ depending on the AC rectangular wave Sg into fluctuations in the voltage (waveform $V_1$ indicated by the dotted line (refer to FIG. 4)).

In this case, the waveform $V_1$ has amplitude smaller than that of the waveform $V_0$. An absolute value $|\Delta v|$ of voltage difference between the waveform $V_0$ and the waveform $V_1$ varies depending on an effect of an object, such as a finger, in proximity to the detection electrode from the outside. It is preferable that the voltage detector DET accurately detects the absolute value $|\Delta v|$ of the voltage difference between the waveform $V_0$ and the waveform $V_1$. To perform accurate detection, the voltage detector DET preferably has a period Reset for resetting charge and discharge of a capacitor based on the frequency of the AC rectangular wave Sg by switching in the circuit.

The detection apparatus 30 illustrated in FIG. 1 sequentially scans each detection block to perform touch detection based on the drive signals Vcom supplied from the drive electrode driver 14.

The detection apparatus 30 outputs the detection signals Vdet of respective detection blocks from a plurality of detection electrodes TDL via the voltage detector DET illustrated in FIG. 3. The detection apparatus 30 supplies the detection signals Vdet to the A/D converter 43 of the detection device 40.

The A/D converter 43 is a circuit that samples analog signals output from the detection signal amplifier 42 to convert those signals into digital signals at a timing synchronized with the drive signals Vcom.

The signal processor 44 includes a digital filter that reduces frequency components (noise components) at frequencies other than the frequency at which the drive signals Vcom included in the output signals from the A/D converter 43 are sampled. The signal processor 44 is a logic circuit that determines whether a touch is made on the detection apparatus 30 based on the output signals from the A/D converter 43.

The signal processor 44 performs processing of extracting only the voltage of difference caused by a finger. The voltage of difference caused by a finger corresponds to the absolute value $|\Delta v|$ of the difference between the waveform $V_0$ and the waveform $V_1$. The signal processor 44 may perform an arithmetic operation for averaging the absolute value $|\Delta v|$ per detection block, thereby calculating the average of the absolute value $|\Delta v|$ With this operation, the signal processor 44 can reduce an effect of noise. The signal processor 44 compares the detected voltage of difference caused by a finger with a predetermined threshold voltage. If the voltage of difference is equal to or higher than the threshold voltage, the signal processor 44 determines that the finger is in the contact state. By contrast, if the voltage of difference is lower than the threshold voltage, the signal processor 44 determines that the finger is in the non-contact state. The detection device 40 thus can perform touch detection.

The coordinate extractor 45 is a logic circuit that calculates, when the signal processor 44 detects a touch, the touch panel coordinates of the touch. The detection timing controller 46 performs control such that the A/D converter 43, the signal processor 44, and the coordinate extractor 45 operate synchronously with one another. The coordinate extractor 45 outputs the touch panel coordinates as signal output Vout.

The capacitance touch detection method is not limited to the mutual capacitance type described above and may be a self-capacitance type. In this case, the AC rectangular wave Sg serving as the drive signal is applied to the detection electrode E2. An electric current depending on the capacitance value of the detection electrode E2 flows in the voltage detector DET. The voltage detector DET converts fluctuations in the electric current depending on the AC rectangular wave Sg into fluctuations in the voltage. In the non-contact state, an electric current depending on the capacitance value of the detection electrode E2 flows. By contrast, in the contact state, the capacitance value generated between the finger and the detection electrode E2 is added to the capacitance value of the detection electrode E2. In the contact state, the detection electrode E2 acts as a capacitance element having a capacitance value larger than that in the non-contact state. The voltage detector DET outputs the detection signals Vdet based on a change in capacitance. The detection device 40 thus can perform touch detection based on the absolute value $|\Delta V|$.

Figure 5:
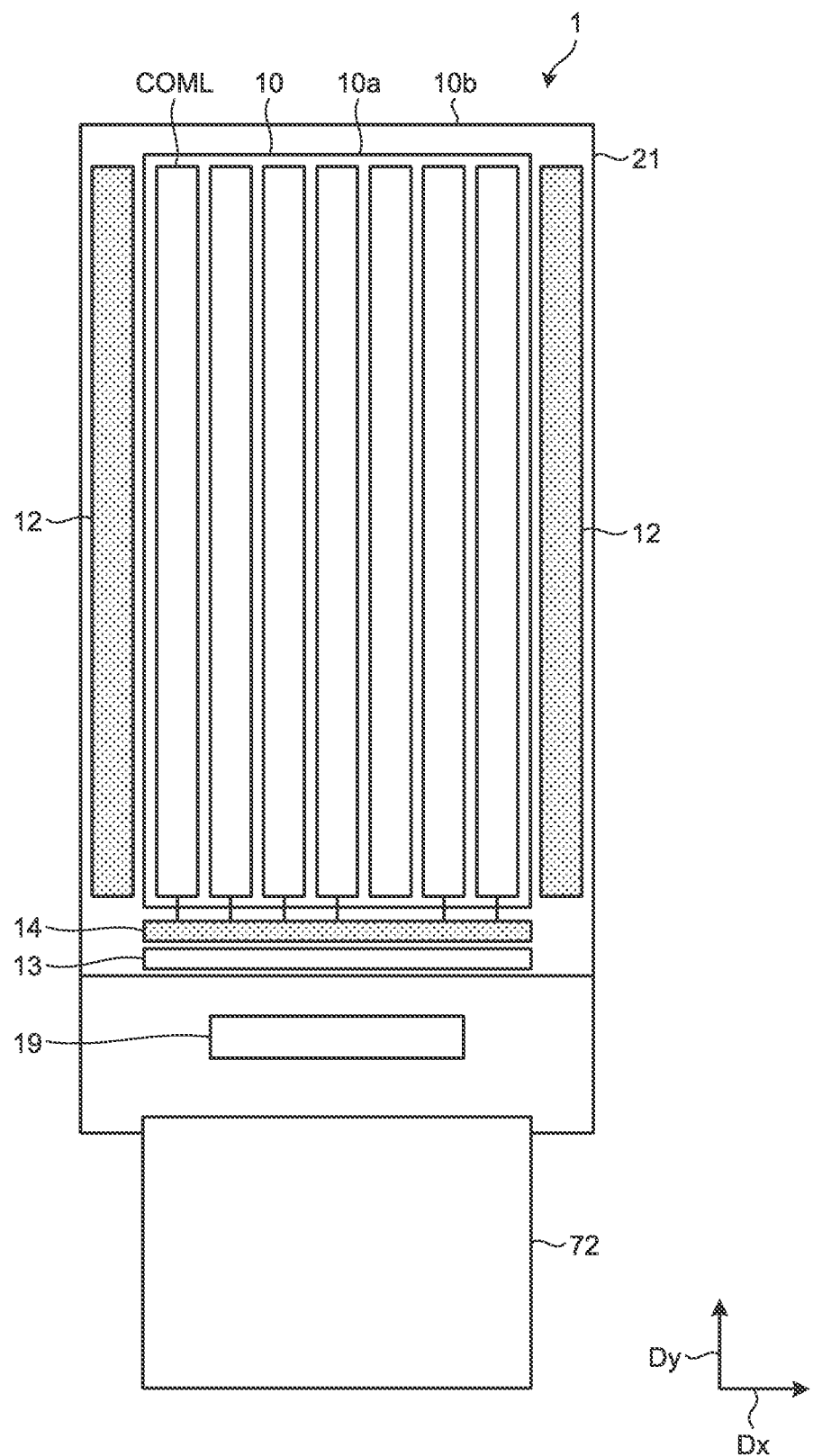
FIG. 5 is a diagram of an example of a module provided with the display apparatus.
Figure 6:
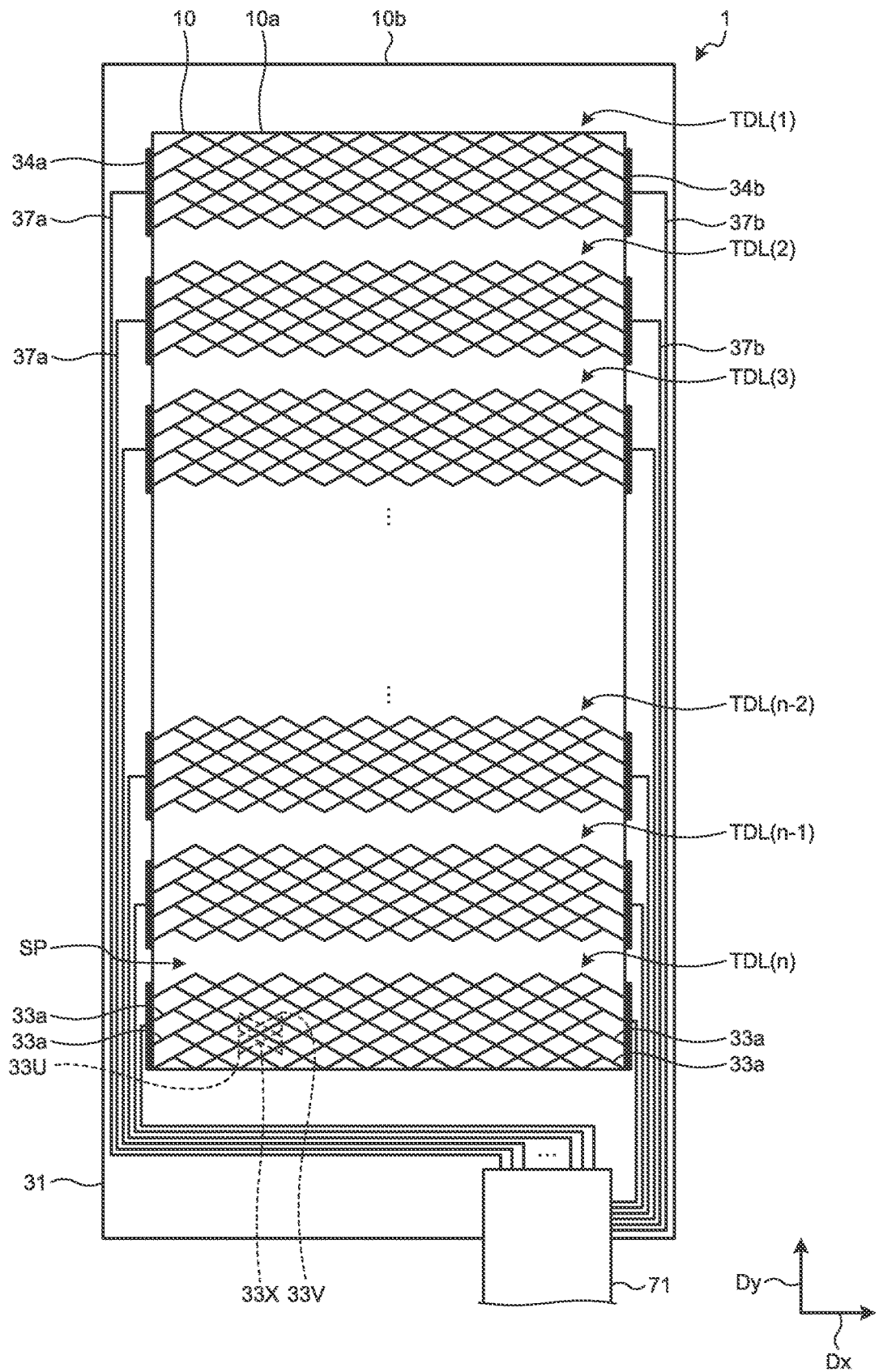
FIG. 6 is a diagram of an example of the module provided with the display apparatus.

FIGS. 5 and 6 are plan views of an example of a module provided with the display apparatus according to the first embodiment. FIG. 5 is a plan view of an example of drive electrodes, and FIG. 6 is a plan view of an example of detection electrodes.

As illustrated in FIG. 5, the display apparatus 1 includes a first substrate 21 and a flexible substrate 72. The first substrate 21 has areas corresponding to a display area 10a of the display panel 20 (refer to FIG. 1) and a peripheral area 10b provided outside the display area 10a. A chip on glass (COG) 19 is mounted on the peripheral area 10b of the first substrate 21. The COG 19 is an integrated circuit (IC) driver chip mounted on the first substrate 21 and includes circuits required for display operations, such as the controller 11, the gate driver 12, and the source driver 13 illustrated in FIG. 1. The peripheral area 10b may surround the display area 10a. In this case, the peripheral area 10b may be referred to as a frame area.

The gate driver 12, the source driver 13, or the drive electrode driver 14 according to the present embodiment may be provided to the first substrate 21 serving as a glass substrate. The COG 19 and the drive electrode driver 14 are provided to the peripheral area 10b. The COG 19 may include the drive electrode driver 14. In this case, the width of the peripheral area 10b can be made narrower. The flexible substrate 72 is coupled to the COG 19. The COG 19 is supplied with the video signals Vdisp and the power supply voltage from the outside via the flexible substrate 72.

As illustrated in FIG. 5, the display device with a touch detection function 10 includes a plurality of drive electrodes COML in an area overlapping with the display area 10a. The drive electrodes COML extend in a direction (second direction Dy) along one side of the display area 10a and are arrayed in a direction (first direction Dx) along the other side of the display area 10a with a gap interposed therebetween. The drive electrodes COML are coupled to the drive electrode driver 14. The drive electrodes COML are made of a translucent conductive material, such as indium tin oxide (ITO).

As illustrated in FIG. 6, the display apparatus 1 further includes a second substrate 31 and a flexible substrate 71. The flexible substrate 71 is provided with the detection device 40 (not illustrated). The detection device 40 may be mounted not on the flexible substrate 71 but on another substrate coupled to the flexible substrate 71. The second substrate 31 is a translucent glass substrate, for example. The second substrate 31 faces the first substrate 21 in a direction perpendicular to the surface of the first substrate 21 illustrated in FIG. 5.

As illustrated in FIG. 6, the display device with a touch detection function 10 includes a plurality of detection electrodes TDL(1), TDL(2), . . . , and TDL(n) in an area overlapping with the display area 10a. In the following description, the detection electrodes TDL(1), TDL(2), . . . , and TDL(n) are referred to as the detection electrodes TDL when those need not be distinguished from one another. The detection electrodes TDL extend in a direction (first direction Dx) intersecting with the extending direction of the drive electrodes COML illustrated in FIG. 5. As illustrated in FIG. 6, the detection electrodes TDL are arrayed in the extending direction (second direction Dy) of the drive electrodes COML with spaces SP interposed therebetween. In other words, the drive electrodes COML and the detection electrodes TDL are arranged intersecting with each other in planar view, and capacitance is generated at the intersections where the drive electrodes COML and the detection electrodes TDL overlap with each other.

In a display operation, the display apparatus 1 sequentially scans each horizontal line. In other words, the display apparatus 1 performs display scanning in parallel with the second direction Dy. In a touch detection operation, the display apparatus 1 sequentially applies the drive signals Vcom to the drive electrodes COML from the drive electrode driver 14, thereby sequentially scanning each detection line. In other words, the display device with a touch detection function 10 performs scanning in parallel with the first direction Dx.

As illustrated in FIG. 6, the detection electrodes TDL according to the present embodiment each include a plurality of first conductive thin wires 33U and a plurality of second conductive thin wires 33V. The first conductive thin wires 33U and the second conductive thin wires 33V are inclined in opposite directions with respect to a direction parallel to one side of the display area 10a.

The first conductive thin wires 33U and the second conductive thin wires 33V have a small width. In the display area 10a, the first conductive thin wires 33U and the second conductive thin wires 33V are arranged with a gap interposed therebetween in a direction (second direction Dy, that is, the direction of the long side of the display area 10a) intersecting with the extending direction of the first conductive thin wires 33U and the second conductive thin wires 33V.

The detection electrodes TDL each include at least one first conductive thin wire 33U and at least one second conductive thin wire 33V intersecting with the first conductive thin wire 33U. The first conductive thin wire 33U and the second conductive thin wire 33V are electrically coupled at a coupling portion 33X. The first conductive thin wires 33U and the second conductive thin wires 33V intersect with each other at a plurality of positions. As a result, the shape of one mesh in the detection electrode TDL is formed into a parallelogram.

Both ends in the extending direction of the first conductive thin wires 33U and the second conductive thin wires 33V are coupled to coupling wires 34a and 34b arranged in the peripheral area 10b. The first conductive thin wires 33U and the second conductive thin wires 33V serving as a main detection part of the detection electrodes TDL are coupled to the coupling wires 34a and 34b via thin wires 33a. With this configuration, the first conductive thin wires 33U and the second conductive thin wires 33V are electrically coupled to each other to serve as one detection electrode TDL.

The first conductive thin wires 33U and the second conductive thin wires 33V are a metal layer made of one or more of aluminum (Al), copper (Cu), silver (Ag), molybdenum (Mo), chromium (Cr), and tungsten (W). Alternatively, the first conductive thin wires 33U and the second conductive thin wires 33V are made of an alloy containing one or more of the metal materials described above. Still alternatively, the first conductive thin wires 33U and the second conductive thin wires 33V may be a multilayered body having a plurality of conductive layers made of the metal materials described above or an alloy containing one or more of the materials. The first conductive thin wires 33U and the second conductive thin wires 33V may be a multilayered body having conductive layers made of translucent conductive oxide, such as ITO. The first conductive thin wires 33U and the second conductive thin wires 33V may be a multilayered body having blackened films, black organic films, or black conductive organic films obtained by combining the metal materials and the conductive layers described above.

The metal materials described above have resistance lower than that of translucent conductive oxide, such as ITO. The metal materials described above, however, have a light shielding property compared with translucent conductive oxide. This property may possibly lower the transmittance or cause the patterns of the detection electrodes TDL to be visually recognized. To address this, the detection electrodes TDL according to the present embodiment each include a plurality of first conductive thin wires 33U and a plurality of second conductive thin wires 33V having a small width. The first conductive thin wires 33U and the second conductive thin wires 33V are arranged with a gap larger than those width interposed therebetween. With this structure, the detection electrodes TDL can have lower resistance and be made invisible. As a result, the detection electrodes TDL have lower resistance, and the display apparatus 1 can have a smaller thickness, a larger screen, or higher definition.

The width of the first conductive thin wires 33U and the second conductive thin wires 33V is preferably 1 μm to 10 μm and more preferably 1 μm to 5 μm. If the width of the first conductive thin wires 33U and the second conductive thin wires 33V is 10 μm or smaller, the area covering apertures is reduced in the display area 10a, making the aperture ratio less likely to be reduced. The apertures correspond to areas in which transmission of light is not suppressed by a black matrix or gate lines GCL and data lines SGL. If the width of the first conductive thin wires 33U and the second conductive thin wires 33V is 1 μm or larger, the shape of the first conductive thin wires 33U and the second conductive thin wires 33V is stabilized, making the wires less likely to be broken.

The detection electrodes TDL are not limited to mesh-like metal thin wires and may include a plurality of zigzag or wavy metal thin wires, for example. The spaces SP between the detection electrodes TDL may be provided with dummy electrodes not serving as detection electrodes. The dummy electrodes may have mesh, zigzag, or wavy patterns similar to those of the detection electrodes TDL.

The coupling wires 34a are coupled to respective first wires 37a. The coupling wires 34b are coupled to respective second wires 37b. In other words, the first wires 37a according to the present embodiment are coupled to first ends of the respective detection electrodes TDL, and the second wires 37b are coupled to second ends thereof. The first wire 37a is provided along one of the long sides of the peripheral area 10b. The second wire 37b is provided along the other of the long sides of the peripheral area 10b. The detection electrodes TDL are coupled to the flexible substrate 71 via the first wires 37a and the second wires 37b.

The first wires 37a and the second wires 37b are made of the same materials as the metal materials, the alloy, or the like of the first conductive thin wires 33U and the second conductive thin wires 33V. The first wires 37a and the second wires 37b simply need to be made of highly conductive materials and may be made of materials different from those of the first conductive thin wires 33U and the second conductive thin wires 33V.

As described above, the first wire 37a and the second wire 37b are coupled to one detection electrode TDL. This configuration can secure coupling of the detection electrode TDL to the flexible substrate 71 with one of the first wire 37a and the second wire 37b when the other thereof is broken. Consequently, the display apparatus 1 according to the present embodiment can increase the reliability of coupling between the detection electrodes TDL and the flexible substrate 71.

Part of the detection electrodes TDL may be arranged outside the display area 10a (in the peripheral area 10b). The coupling wires 34a and 34b may be arranged not in the peripheral area 10b but in the display area 10a. The coupling wires 34a and 34b are coupled to the detection device 40 via the first wires 37a and the second wires 37b, respectively. The coupling wires 34a and 34b may serve as wiring that couples the first conductive thin wires 33U and the second conductive thin wires 33V to the detection device 40.

Figure 7:
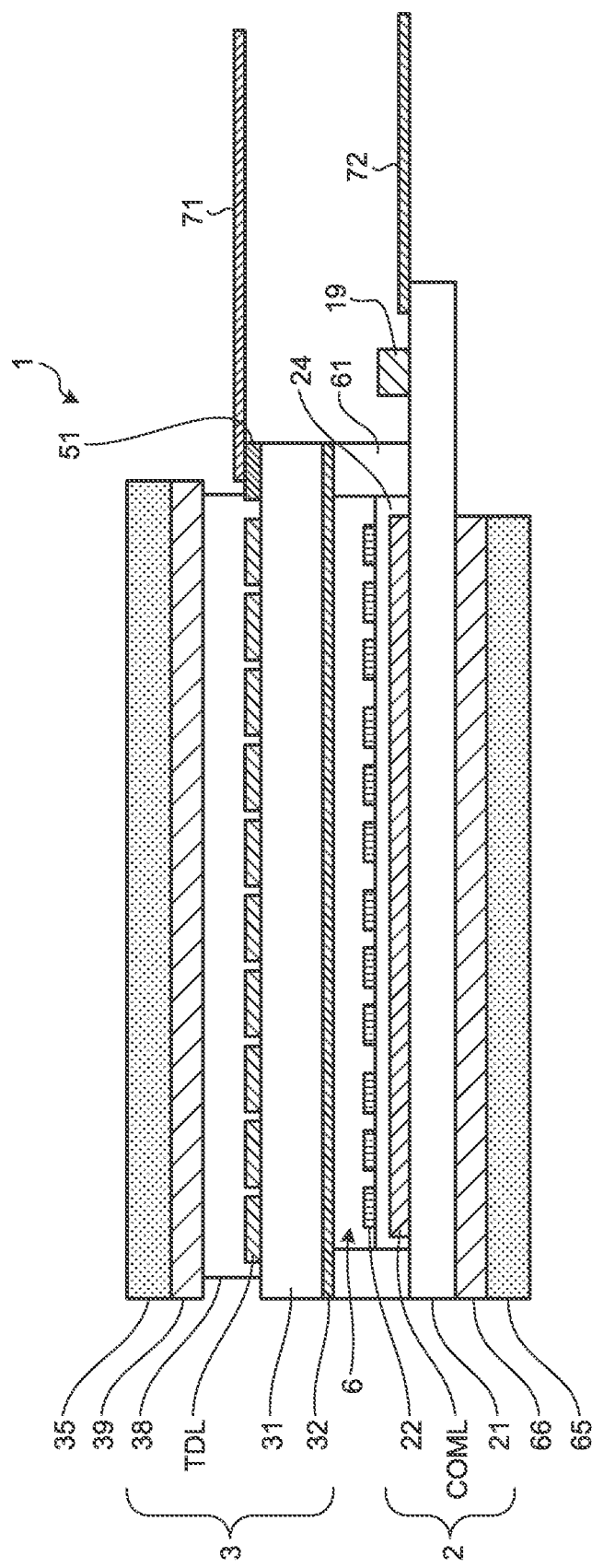
FIG. 7 is a sectional view of a schematic sectional structure of the display apparatus according to the first embodiment.

FIG. 7 is a sectional view of a schematic sectional structure of the display apparatus according to the first embodiment. As illustrated in FIG. 7, the display apparatus 1 includes a pixel substrate 2, a counter substrate 3, and a liquid crystal layer 6. The counter substrate 3 is arranged facing the pixel substrate 2 in a direction perpendicular to the surface of the pixel substrate 2. The liquid crystal layer 6 is provided between the pixel substrate 2 and the counter substrate 3.

The pixel substrate 2 includes the first substrate 21, a plurality of pixel electrodes 22, a plurality of drive electrodes COML, and an insulating layer 24. The first substrate 21 serves as a circuit board. The pixel electrodes 22 are arranged in a matrix (row-column configuration) above the first substrate 21. The drive electrodes COML are provided between the first substrate 21 and the pixel electrodes 22. The insulating layer 24 provides electrical insulation between the pixel electrodes 22 and the drive electrodes COML. A polarizing plate 65 is provided under the first substrate 21 with an adhesive layer 66 interposed therebetween.

The counter substrate 3 includes the second substrate 31 and a color filter 32. The color filter 32 is provided on a first surface of the second substrate 31. The detection electrodes TDL of the detection apparatus 30 are provided on a second surface of the second substrate 31. As illustrated in FIG. 7, the detection electrodes TDL are provided on the second substrate 31. A protective layer 38 is provided on the detection electrodes TDL. The protective layer 38 protects the first conductive thin wires 33U and the second conductive thin wires 33V of the detection electrodes TDL. The protective layer 38 may be made of a translucent resin, such as an acrylic resin. A polarizing plate 35 is provided on the protective layer 38 with an adhesive layer 39 interposed therebetween. The detection electrodes TDL are electrically coupled to the flexible substrate 71 via terminals 51.

The first substrate 21 and the second substrate 31 are arranged facing each other with a predetermined gap formed by a sealing portion 61 interposed therebetween. The liquid crystal layer 6 is provided to the space surrounded by the first substrate 21, the second substrate 31, and the sealing portion 61. The liquid crystal layer 6 modulates light passing therethrough depending on the state of an electric field. The liquid crystal layer 6, for example, includes liquid crystals in a lateral electric-field mode, such as the in-plane switching (IPS) mode including the fringe field switching (FFS) mode. The liquid crystal layer 6 serves as a display functional layer that displays an image. An orientation film may be provided between the liquid crystal layer 6 and the pixel substrate 2 and between the liquid crystal layer 6 and the counter substrate 3 illustrated in FIG. 7.

Figure 8:
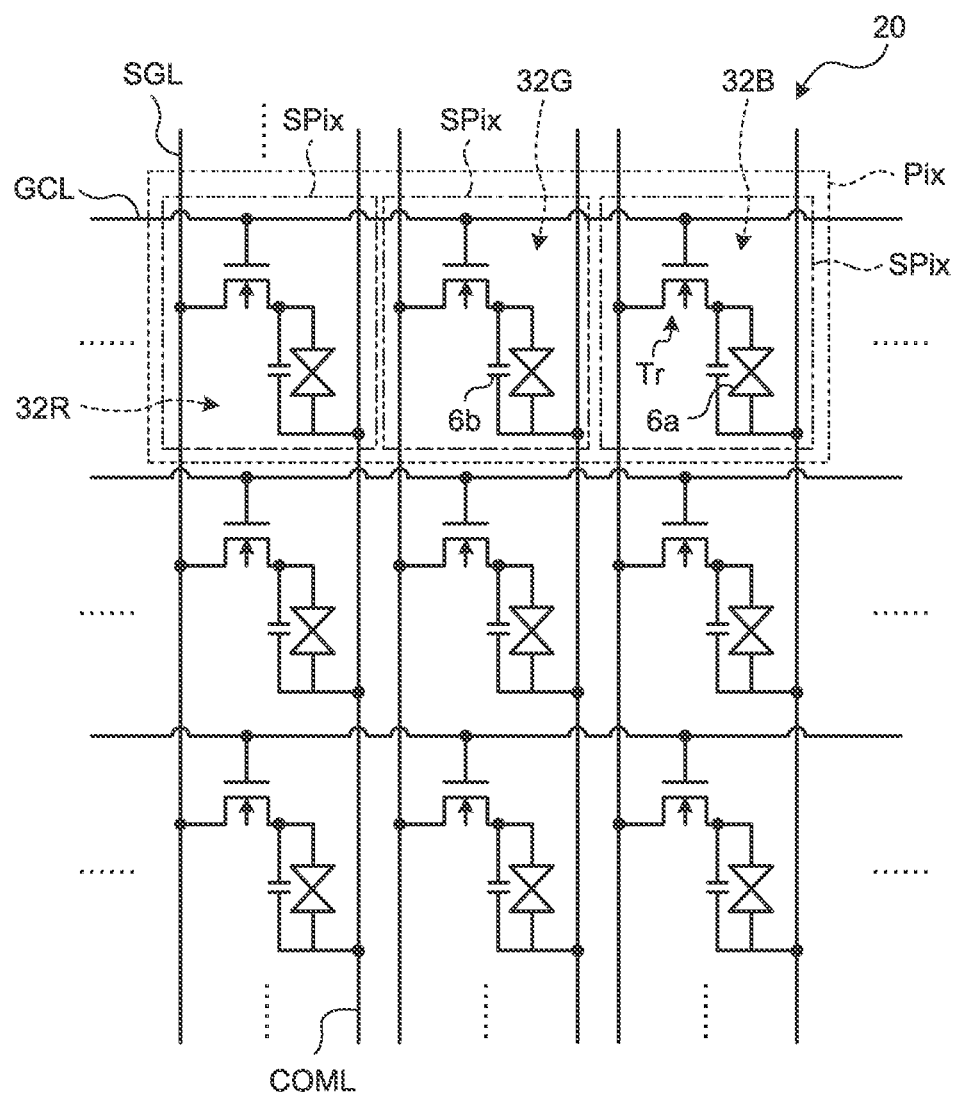
FIG. 8 is a circuit diagram of pixel arrangement in the display apparatus according to the first embodiment.

FIG. 8 is a circuit diagram of pixel arrangement in the display apparatus according to the first embodiment. The first substrate 21 illustrated in FIG. 7 is provided with switching elements of the respective sub-pixels SPix and wiring, such as the data lines SGL and the gate lines GCL, as illustrated in FIG. 8. The switching elements are thin-film transistor elements (hereinafter, referred to as TFT elements) Tr, for example. The data lines SGL are wiring that supplies the pixel signals Vpix to the respective pixel electrodes 22. The gate lines GCL are wiring that drives the TFT elements Tr. The data lines SGL and the gate lines GCL extend on a plane parallel to the surface of the first substrate 21.

The display panel 20 illustrated in FIG. 8 includes a plurality of sub-pixels SPix arrayed in a matrix (row-column configuration). The sub-pixels SPix each include the TFT element Tr and a liquid crystal element 6a. The TFT element Tr is a thin-film transistor and is an n-channel metal oxide semiconductor (MOS) TFT in this example. One of the source and the drain of the TFT element Tr is coupled to the data line SGL, the gate thereof is coupled to the gate line GCL, and the other of the source and the drain thereof is coupled to a first end of the liquid crystal element 6a. The first end of the liquid crystal element 6a is coupled to the other of the source and the drain of the TFT element Tr, and a second end thereof is coupled to the drive electrode COML. The insulating layer 24 is provided between the pixel electrodes 22 and the common electrodes (drive electrodes COML), thereby forming holding capacitance 6b illustrated in FIG. 8.

The sub-pixel SPix is coupled to the other sub-pixels SPix belonging to the same row in the display panel 20 by the gate line GCL. The gate lines GCL are coupled to the gate driver 12 (refer to FIG. 1) and supplied with the scanning signals Vscan from the gate driver 12. The sub-pixel SPix is coupled to the other sub-pixels SPix belonging to the same column in the display panel 20 by the data line SGL. The data lines SGL are coupled to the source driver 13 (refer to FIG. 1) and supplied with the pixel signals Vpix from the source driver 13. The sub-pixel SPix is also coupled to the other sub-pixels SPix belonging to the same column by the drive electrode COML. The drive electrodes COML are coupled to the drive electrode driver 14 (refer to FIG. 1) and supplied with the drive signals Vcom from the drive electrode driver 14. In other words, a plurality of sub-pixels SPix belonging to the same column share one drive electrode COML in this example. The extending direction of the drive electrodes COML according to the present embodiment is parallel to that of the data lines SGL. The extending direction of the drive electrodes COML according to the present embodiment is not limited thereto and may be parallel to that of the gate lines GCL, for example.

The color filter 32 illustrated in FIG. 7, for example, includes periodically arrayed color areas 32R, 32G, and 32B of three colors of red (R), green (G), and blue (B), respectively. The color areas 32R, 32G, and 32B of the three colors of R, G, and B, respectively, serve as a set and correspond to the respective sub-pixels SPix illustrated in FIG. 8. A set of color areas 32R, 32G, and 32B serves as a pixel Pix. As illustrated in FIG. 7, the color filter 32 faces the liquid crystal layer 6 in a direction perpendicular to the first substrate 21. The color filter 32 may have another combination of colors as long as those are different colors. The color filter 32 does not necessarily have a combination of three colors and may have a combination of four or more colors.

The drive electrodes COML illustrated in FIGS. 5 and 7 serve as common electrodes that supply a common potential to a plurality of pixel electrodes 22 in the display panel 20. The drive electrodes COML also serve as drive electrodes in mutual capacitance touch detection performed by the detection apparatus 30. The detection apparatus 30 includes the drive electrodes COML in the pixel substrate 2 and the detection electrodes TDL in the counter substrate 3. As described above, capacitance is generated at the intersections of the drive electrodes COML and the detection electrodes TDL.

In a mutual capacitance touch detection operation performed by the detection apparatus 30, the drive electrode driver 14 sequentially scans the drive electrodes COML in a time-division manner. The detection apparatus 30 thus sequentially selects one detection block of the drive electrodes COML. The detection electrodes TDL output the detection signals Vdet, thereby performing touch detection in one detection block. In other words, the drive electrodes COML correspond to the drive electrode E1 in the basic principle of mutual capacitance touch detection described above, and the detection electrodes TDL correspond to the detection electrode E2. The detection apparatus 30 detects touch input according to the basic principle. The detection electrodes TDL and the drive electrodes COML intersect with each other and serve as a capacitance touch sensor formed in a matrix (row-column configuration). With this configuration, the display apparatus 1 performs scanning over the entire touch detection surface of the detection apparatus 30, thereby detecting a position where an external conductor is in contact with or in proximity to the touch detection surface.

In an example of the operation method performed by the display apparatus 1, the display apparatus 1 performs a touch detection operation (detection period) and a display operation (display period) in a time division manner. The touch detection operation and the display operation may be performed in any division manner.

The drive electrodes COML according to the present embodiment also serve as the common electrodes of the display panel 20. In the display period, the controller 11 supplies the drive signals Vcom serving as a common electrode potential for display to the selected drive electrodes COML via the drive electrode driver 14.

In a case where the display apparatus 1 performs a detection operation using only the detection electrodes TDL without using the drive electrodes COML in the detection period, that is, in a case where the display apparatus 1 performs touch detection based on the basic principle of self-capacitance (also referred to as self-type) touch detection, the drive electrode driver 14 may supply the drive signals Vcom for touch detection to the detection electrodes TDL.

Figure 9:
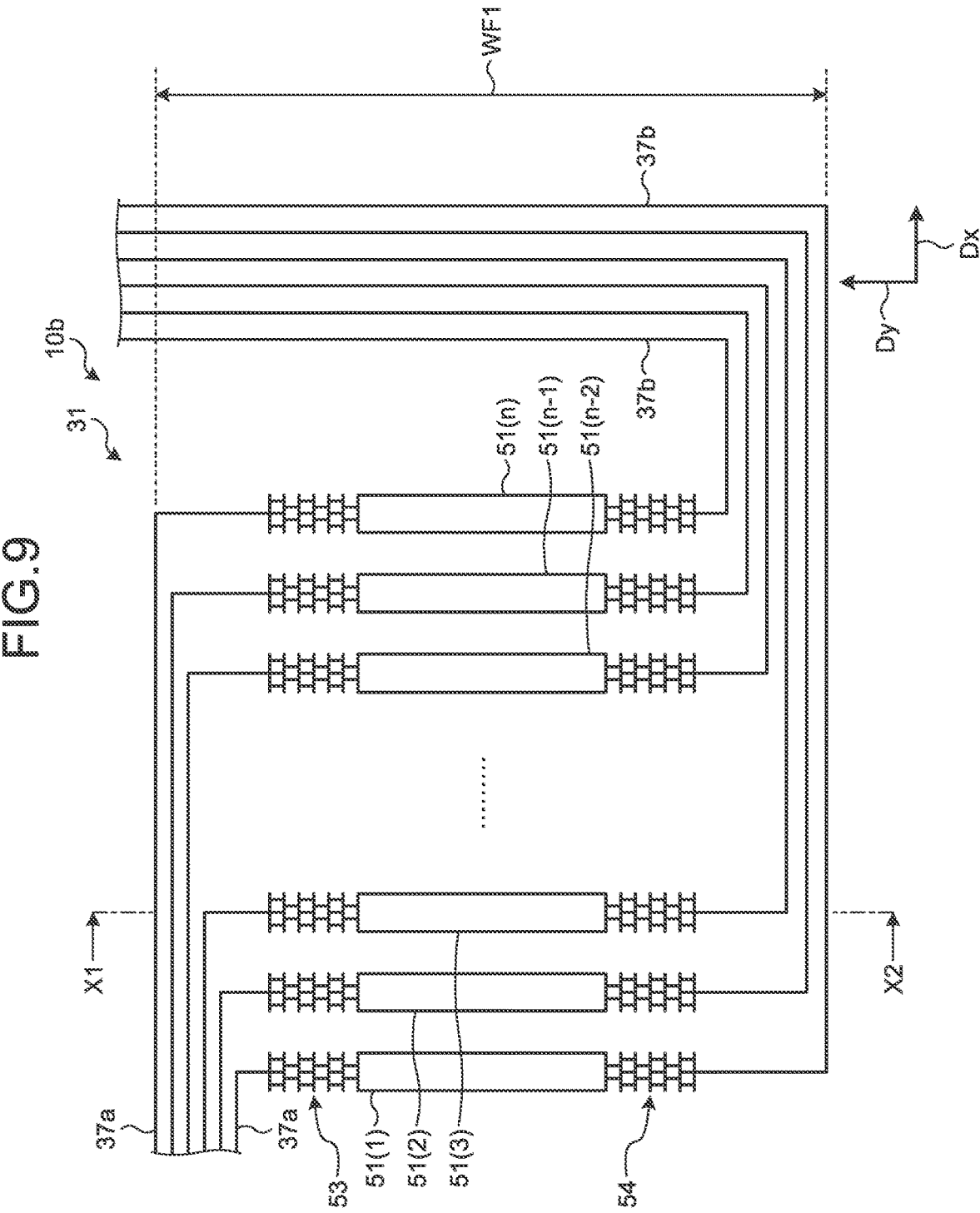
FIG. 9 is a plan view of terminals according to the first embodiment.
Figure 10:
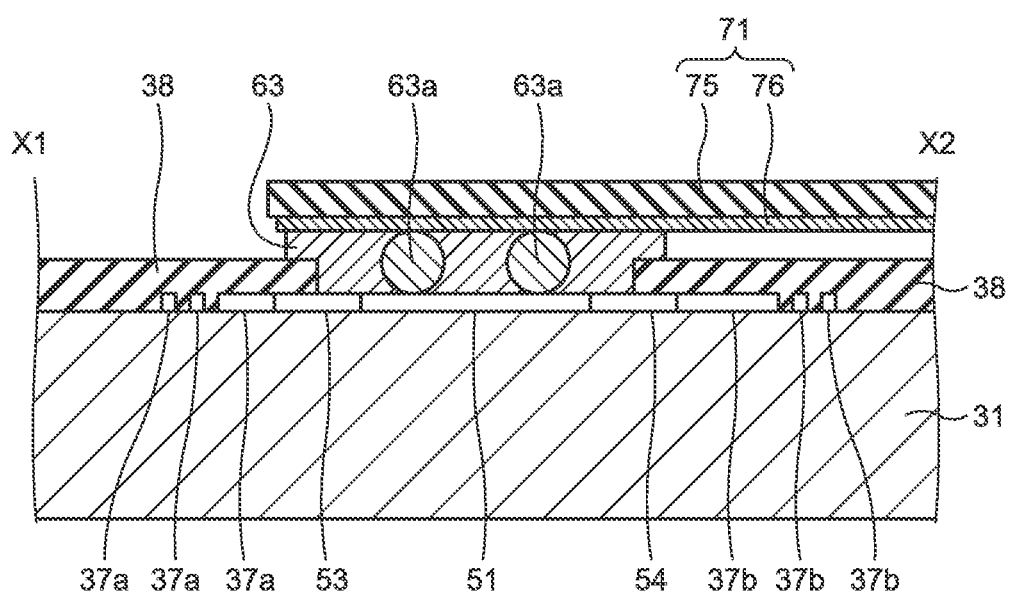
FIG. 10 is a sectional view along line X1-X2 in FIG. 9.

The following describes the coupling structure of the detection electrodes TDL and the flexible substrate 71 according to the present embodiment with reference to FIGS. 6, 9, and 10. FIG. 9 is a plan view of terminals according to the first embodiment. FIG. 10 is a sectional view along line X1-X2 in FIG. 9.

As illustrated in FIG. 9, a plurality of terminals 51(1), 51(2), 51(3), . . . , 51(n−2), 51(n−1), and 51(n) are provided in the peripheral area 10b of the second substrate 31. In the following description, the terminals 51(1), 51(2), 51(3), . . . , 51(n−2), 51(n−1), and 51(n) are referred to as the terminals 51 when those need not be distinguished from one another. The terminals 51 each have a rectangular shape the long side of which extends along the second direction Dy and the short side of which extends along the first direction Dx. The terminals 51 are arrayed in the first direction Dx. The terminals 51 are made of the metal materials or the alloy material described above.

The terminals 51(1), 51(2), 51(3), . . . , 51(n−2), 51(n−1), and 51(n) correspond to the detection electrodes TDL(1), TDL(2), TDL(3), TDL(n−2), TDL(n−1), and TDL(n) in FIG. 6, respectively. In other words, the first wire 37a coupled to a first end of the detection electrode TDL(1) is coupled to a first end of the terminal 51(1) in the second direction Dy (on the side facing the display area 10a) via a first portion 53. The second wire 37b coupled to a second end of the detection electrode TDL(1) is coupled to a second end of the terminal 51(1) on the side opposite to the side to which the first wire 37a is coupled (on the side facing the outer rim of the peripheral area 10b) via a second portion 54. Similarly, the n-th detection electrode TDL(n) is electrically coupled to the terminal 51(n) via the first wire 37a and the second wire 37b.

The first wires 37a according to the present embodiment are coupled to the first ends of the respective terminals 51 through the peripheral area 10b between the terminals 51 and the display area 10a. The second wires 37b are coupled to the second ends of the respective terminals 51 through the peripheral area 10b on the opposite side of the display area 10a across the terminals 51. As described above, the first wire 37a and the second wire 37b coupled to one detection electrode TDL are electrically coupled to the same one terminal 51.

As illustrated in FIG. 10, the terminal 51, the first portion 53, the second portion 54, the first wires 37a, and the second wires 37b are provided on the second substrate 31. These wires are provided to the same layer as that of the detection electrodes TDL (refer to FIG. 6). The protective layer 38 covers the first wires 37a, part of the first portion 53, the second wires 37b, and part of the second portion 54. The terminal 51 is arranged between adjacent parts of the protective layer 38 and exposed from the protective layer 38.

The flexible substrate 71 faces the terminal 51. The flexible substrate 71 includes a base 75 and a coupling terminal 76. The coupling terminal 76 is provided on the surface of the base 75 facing the second substrate 31 and is arranged facing the terminal 51. The terminal 51 is electrically coupled to the coupling terminal 76 with a conductive adhesive 63 interposed therebetween. The conductive adhesive 63 is an anisotropic conductive film (ACF), for example. The conductive adhesive 63 includes a number of conductive particles 63a. The conductive particles 63a are spherical particles obtained by covering a metal material with an insulating layer, for example. To simplify the drawing, FIG. 10 illustrates two conductive particles 63a alone.

The flexible substrate 71 is arranged on the conductive adhesive 63 and then heated and pressurized. At this time, the conductive particles 63a present between the coupling terminal 76 and the terminal 51 are crushed, whereby the metal material in the conductive particles 63a is exposed from the insulating layer. As a result, the coupling terminal 76 is electrically coupled to the terminal 51 via the conductive particles 63a. The conductive adhesive 63 are provided continuously over the terminals 51. Electrical connection between the conductive particles 63a in an in-plane direction of the second substrate 31 is suppressed because the pressurization is smaller in the in-plane direction than in the vertical direction. As a result, the terminals 51 or the coupling terminals 76 adjacent to each other in planar view are not electrically connected, and the terminals 51 and the respective coupling terminals 76 are electrically connected in the vertical direction.

The coupling terminals 76 are provided in correspondence with the respective terminals 51(1), 51(2), . . . , 51(n–2), 51(n–1), and 51(n) illustrated in FIG. 9. The coupling terminals 76 are electrically coupled to the respective terminals 51 in one-to-one correspondence.

As described above, the first wire 37a and the second wire 37b coupled to the detection electrode TDL are electrically coupled to the coupling terminal 76 of the flexible substrate 71 via the same one terminal 51. With this configuration, the number of terminals 51 is smaller than the total number of first wires 37a and second wires 37b. When one of the first wire 37a and the second wire 37b coupled to the same one terminal 51 is broken, the other thereof remains coupled to the terminal 51. This configuration can prevent the wires from being completely broken between the detection electrode TDL and the terminal 51.

There is a case where the first wires 37a and the second wires 37b are coupled to the flexible substrate 71 with respective terminals (refer to JP-A-2010-39816). In this case, the flexible substrate 71 needs to have a multilayered structure, and the first wires 37a and the second wires 37b need to be electrically coupled in the flexible substrate 71. By contrast, the first wire 37a and the second wire 37b according to the present embodiment are coupled to the flexible substrate 71 via one terminal 51. As a result, the layer configuration of the flexible substrate 71 and the configuration of the wires can be simplified. Consequently, the present embodiment can simplify the configuration of the flexible substrate 71 and reduce the manufacturing cost.

The coupling form of the first wires 37a and the second wires 37b to the terminals 51 may be appropriately changed. The second wires 37b may be coupled to the first ends (on the side closer to the display area 10a) of the respective terminals 51, and the first wires 37a may be coupled to the second ends (on the side closer to the outer rim of the peripheral area 10b) of the respective terminals 51, for example.

Figure 11:
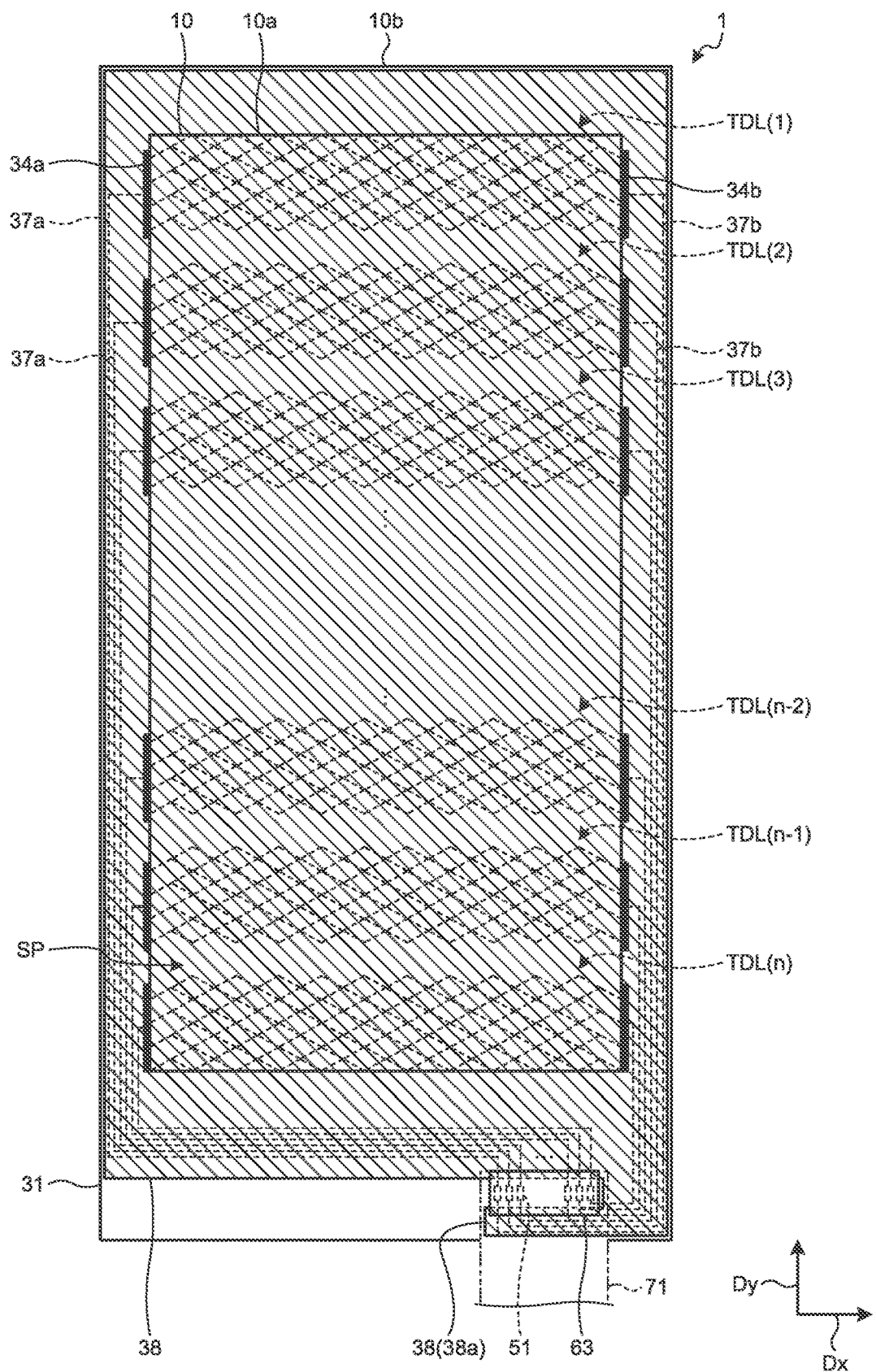
FIG. 11 is a plan view of a protective layer provided to a second substrate.
Figure 12:
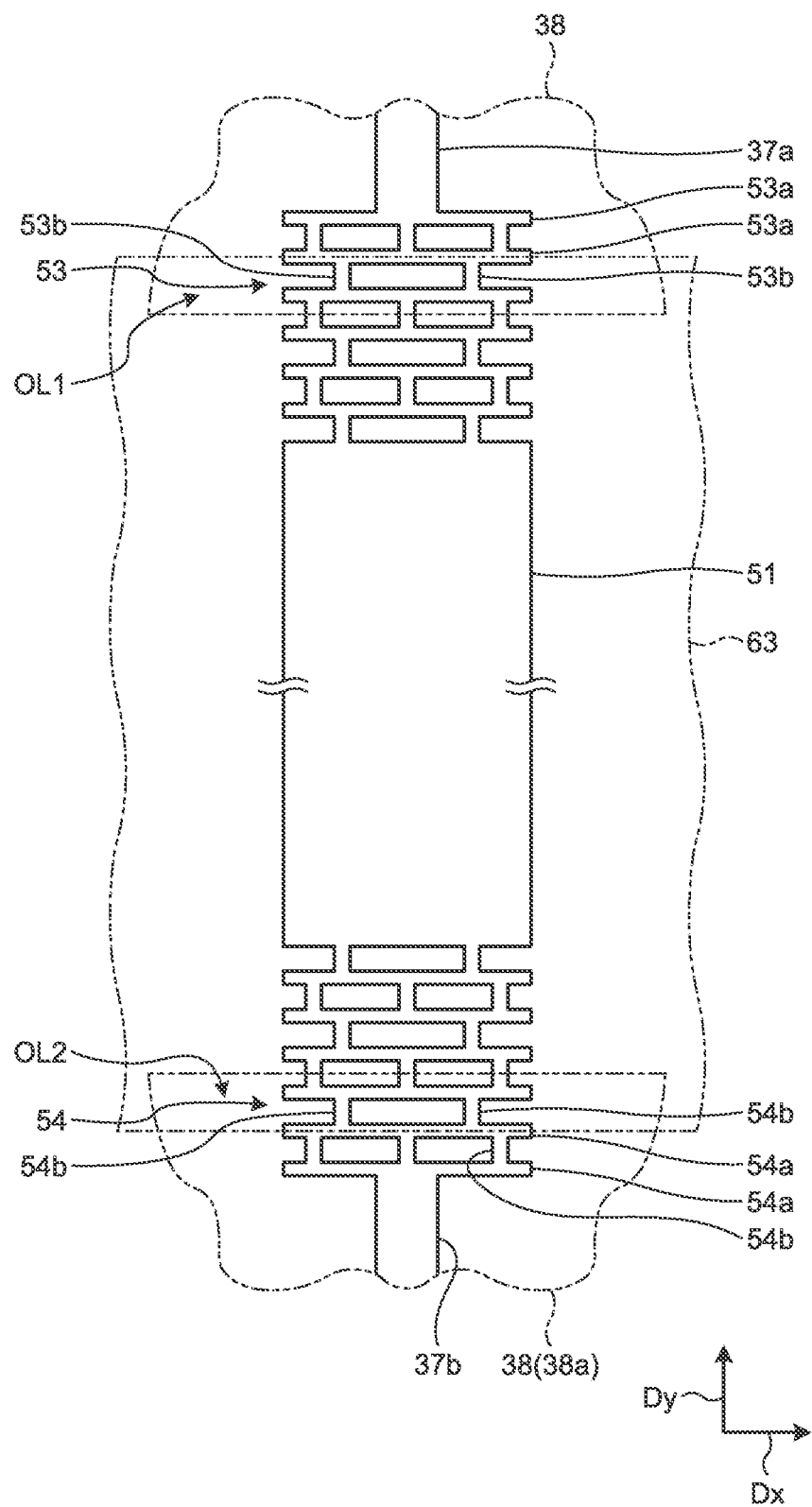
FIG. 12 is a plan view illustrating the terminal according to the first embodiment in an enlarged manner.

The following describes the configuration of the first portion 53 and the second portion 54. FIG. 11 is a plan view of the protective layer provided to the second substrate. FIG. 12 is a plan view illustrating the terminal according to the first embodiment in an enlarged manner. In FIG. 11, the protective layer 38 is hatched.

As illustrated in FIG. 11, the protective layer 38 is provided covering the detection electrodes TDL in the display area 10a and the first wires 37a and the second wires 37b in the peripheral area 10b. In the peripheral area 10b near the terminals 51, the protective layer 38 is provided to the peripheral area 10b between the terminals 51 and the display area 10a to cover the first wires 37a extending in the first direction Dx. A protrusion 38a of the protective layer 38 is provided to the peripheral area 10b between the terminals 51 and the outer rim of the second substrate 31 to cover the second wires 37b extending in the first direction Dx. The protective layer 38 is not provided to the area provided with the terminals 51.

As illustrated in FIG. 12, the protective layer 38 covers the first wire 37a coupled to the first end of the terminal 51 and part of the first portion 53. The protective layer 38 (protrusion 38a) covers the second wire 37b coupled to the second end of the terminal 51 and part of the second portion 54. The conductive adhesive 63 is provided covering the terminal 51 exposed from the protective layer 38. The conductive adhesive 63 is provided overlapping partially with the protective layer 38 at an overlapping portion OL1. The conductive adhesive 63 is provided overlapping partially with the protective layer 38 (protrusion 38a) at an overlapping portion OL2.

As illustrated in FIG. 12, the first portion 53 coupling the terminal 51 and the first wire 37a includes linear portions 53a and coupling portions 53b. The linear portion 53a is provided along the first direction Dx and a plurality of linear portions 53a are arrayed in the second direction Dy. In other words, the linear portions 53a extend in the direction along the short side of the terminal 51 and are arrayed between the first wire 37a and the terminal 51. The coupling portions 53b couple the linear portions 53a adjacent to each other in the second direction Dy. The coupling portions 53b are arrayed in the first direction Dx. The coupling portions 53b are arranged not linearly continuously but alternately in the second direction Dy such that those positions are different in the first direction Dx. The numbers and the shapes of the linear portions 53a and the coupling portions 53b illustrated in FIG. 12 are given by way of example only and may be appropriately changed.

The second portion 54 that couples the terminal 51 and the second wire 37b includes linear portions 54a and coupling portions 54b. The second portion 54 has the same structure as that of the first portion 53. The linear portion 54a is provided along the first direction Dx and a plurality of linear portions 54a are arrayed in the second direction Dy. The coupling portions 54b couple the linear portions 54a adjacent to each other in the second direction Dy. While the second portion 54 has a structure line-symmetric to the first portion 53, the structure is not limited thereto. The second portion 54 may have a shape different from that of the first portion 53. The first portion 53 and the second portion 54 are made of the same metal material as that of the terminal 51.

The protective layer 38 covers the first wire 37a and part of the first portion 53. The protective layer 38 also covers the second wire 37b and part of the second portion 54. The conductive adhesive 63 covers the terminal 51 between the parts of the protective layer 38. The conductive adhesive 63 partially overlaps with the protective layer 38 at the overlapping portions OL1 and OL2.

The first portion 53 and the second portion 54 provided in this manner increases the contact area of the protective layer 38. This structure increases the adhesion between the protective layer 38 and the first portion 53 and between the protective layer 38 and the second portion 54. The protective layer 38 is applied and formed by a printing method, such as an inkjet system. If the first portion 53 and the second portion 54 are not provided, the protective layer 38 may possibly be provided to the position overlapping with the terminal 51 because of the fluidity of ink when the protective layer 38 is applied and formed. Specifically, the ink may possibly flow to the terminal 51 because the metal material used for the terminal 51 has high wettability to the resin material used for the ink. To address this, the present embodiment includes the first portion 53 and the second portion 54. Consequently, the present embodiment can reduce the area of the metal material coming into contact with the ink when the protective layer 38 is applied and formed, thereby preventing the protective layer 38 from overlapping with the terminal 51.

The first portion 53 and the second portion 54 are not necessarily provided. In this case, the first wire 37a is coupled to the first end of the terminal 51, and the second wire 37b is coupled to the second end thereof.

First Modification of the First Embodiment

Figure 13:
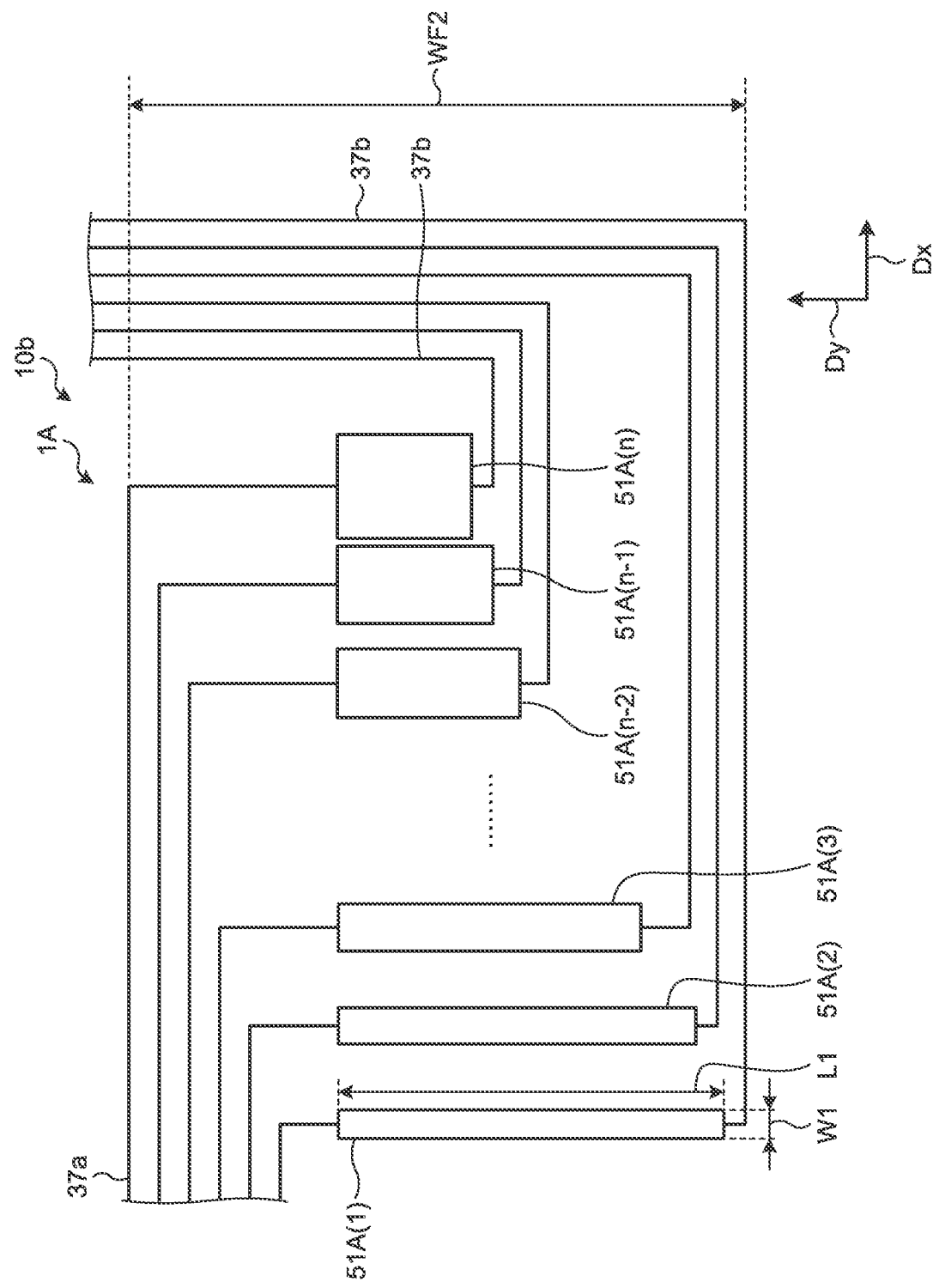
FIG. 13 is a plan view of the terminals according to a first modification of the first embodiment.

FIG. 13 is a plan view of the terminals according to a first modification of the first embodiment. As illustrated in FIG. 13, terminals 51A of a display apparatus 1A according to the present modification have different shapes. A length L1 gradually decreases, and a width W1 gradually increases in order of terminals 51A(1), 51A(2), 51A(3), 51A(n−2), 51A(n−1), and 51A(n). The length L1 and the width W1 are determined such that the terminals 51A(1), 51A(2), 51A(3), 51A(n−2), 51A(n−1), and 51A(n) have substantially the same area. The length L1 is the length of the terminals 51A in the second direction Dy, and the width W1 is the length of the terminals 51A in the first direction Dx.

Also in the present modification, the first wires 37a are coupled to the first ends of the respective terminals 51A, and the second wires 37b are coupled to the second ends of the respective terminals 51A. The first ends of the terminals 51A are arranged such that those positions are the same in the second direction Dy. The second ends of the terminals 51A are arranged in a manner shifting in the second direction Dy from the terminal 51A(1) to the terminal 51(n). With this configuration, the second wires 37b coupled to the second ends of the respective terminals 51A and extending in the first direction Dx are provided in an area corresponding to the part provided by shortening the length L1. As a result, the width of a wiring area WF2 can be smaller than that of a wiring area WF1 illustrated in FIG. 9. Consequently, the display apparatus 1A can make the peripheral area 10b provided with the terminals 51A narrower.

The wiring areas WF1 and WF2 are provided with the first wires 37a extending in the first direction Dx and the second wires 37b extending in the first direction Dx. The wiring areas WF1 and WF2 are belt-like areas extending in parallel with the peripheral area 10b (refer to FIG. 6) provided with the terminals 51A. The width of the wiring area WF2 corresponds to the distance between the first wire 37a and the second wire 37b positioned outermost in the second direction Dy out of the first wires 37a extending in the first direction Dx and the second wires 37b extending in the first direction Dx. In the example illustrated in FIG. 13, the width of the wiring area WF2 corresponds to the distance in the second direction Dy between the first wire 37a coupled to the terminal 51A(n) out of the first wires 37a extending in the first direction Dx and the second wire 37b coupled to the terminal 51A(1) out of the second wires 37b extending in the first direction Dx.

The terminals 51A according to the present modification have different shapes but have substantially the same area. This configuration can suppress variations in contact resistance of the flexible substrate 71 with the coupling terminals 76 (refer to FIG. 10). The array pitches between the terminals 51A in the first direction Dx, that is, the distances between the center positions of the terminals 51A in the first direction Dx are equal. This configuration can reduce a change in the design of the flexible substrate 71 coupled to the terminals 51A. The configuration is not limited thereto, and the terminals 51A may have the same width W1 and different lengths L1.

The present modification does not include the first portion 53 and the second portion 54 illustrated in FIGS. 9 and 12. The first wires 37a and the second wires 37b are directly coupled to the terminals 51A. The terminals 51A may be provided with the first portion 53 and the second portion 54.

Second Modification of the First Embodiment

Figure 14:
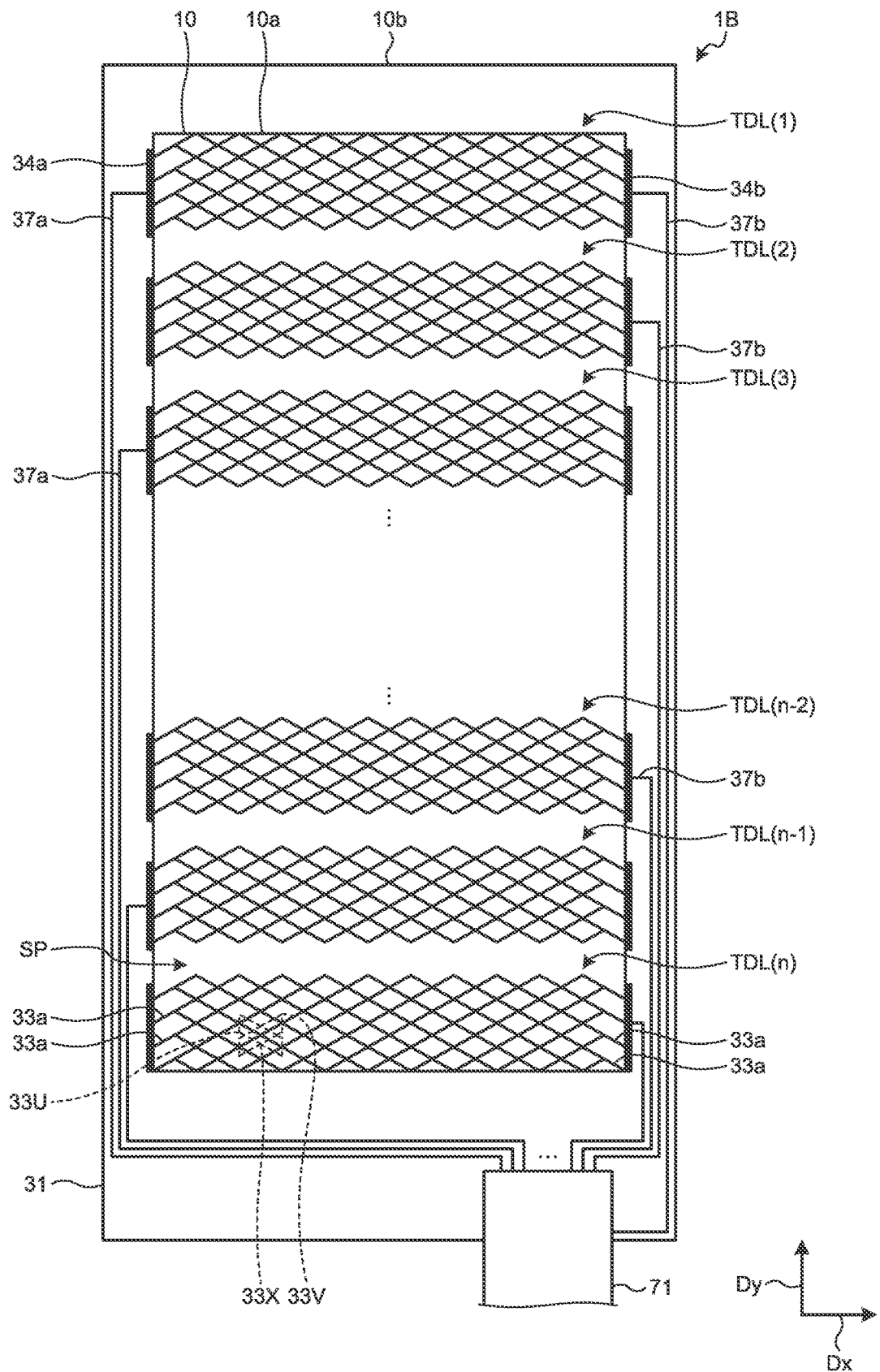
FIG. 14 is a plan view of the second substrate according to a second modification of the first embodiment.
Figure 15:
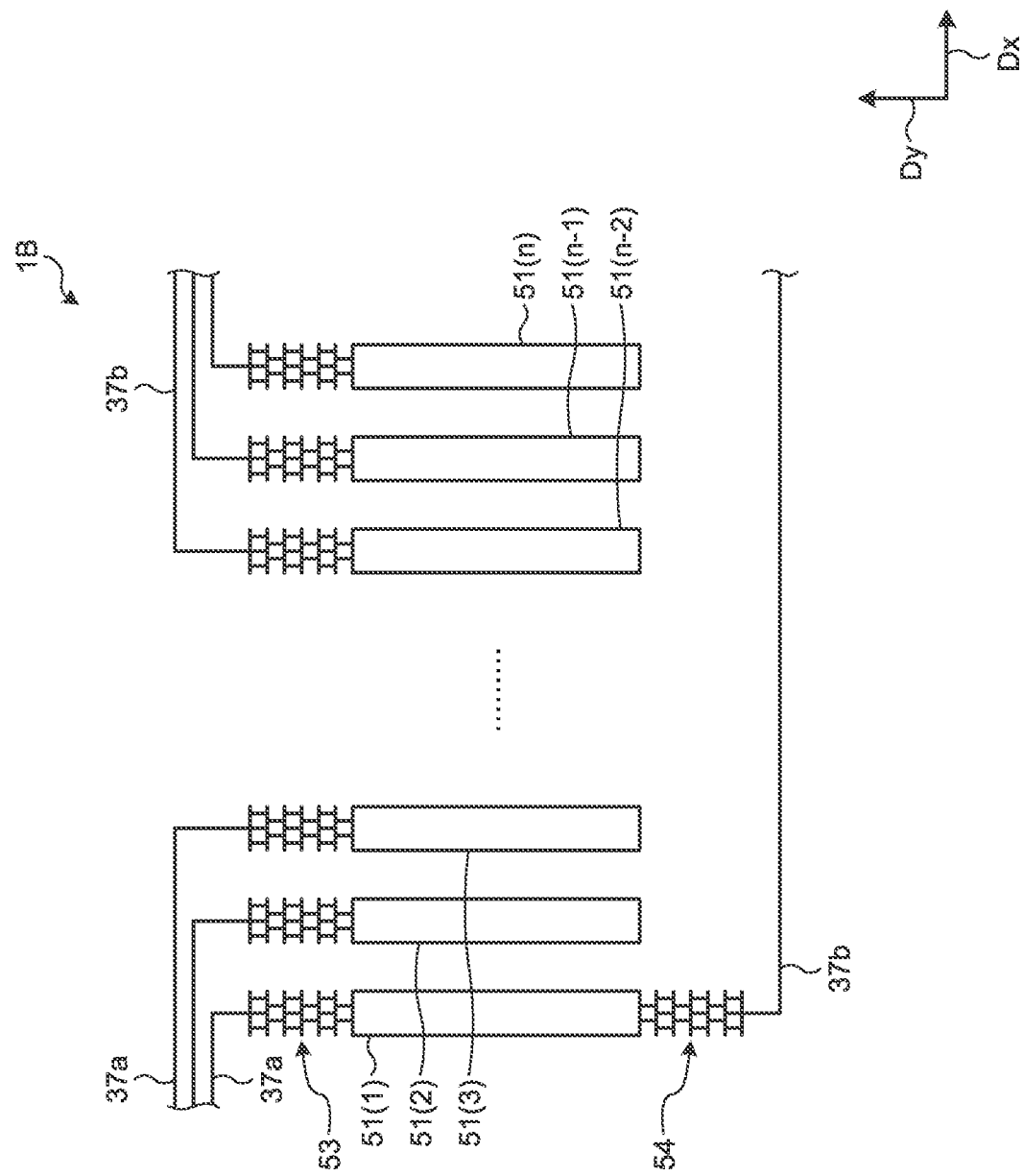
FIG. 15 is a plan view of the terminals according to the second modification of the first embodiment.

FIG. 14 is a plan view of the second substrate according to a second modification of the first embodiment. FIG. 15 is a plan view of the terminals according to the second modification of the first embodiment. As illustrated in FIG. 14, in a display apparatus 1B according to the present modification, the first wire 37a is coupled to the first end of the detection electrode TDL(1), and the second wire 37b is coupled to the second end thereof. Either of the first wire 37a or the second wire 37b is coupled to the detection electrodes TDL(2) to TDL(n). The second wire 37b is coupled to the second end of the detection electrode TDL(2), and the first wire 37a is coupled to the first end of the detection electrode TDL(3). The first wires 37a and the second wires 37b are alternately coupled to the detection electrodes TDL(2) to TDL(n).

The detection electrode TDL(1) is arranged farthest from the peripheral area 10b to which the flexible substrate 71 is coupled. The first wire 37a and the second wire 37b coupled to the detection electrode TDL(1) are arranged closer to the outer periphery of the peripheral area 10b than the first wires 37a and the second wires 37b coupled to the detection electrodes TDL(2) to TDL(n).

As illustrated in FIG. 15, the first wire 37a and the second wire 37b coupled to the detection electrode TDL(1) are coupled to the terminal 51(1). The first wire 37a is coupled to the first end of the terminal 51(1) via the first portion 53. The second wire 37b is coupled to the second end of the terminal 51(1) via the second portion 54. One of the first wire 37a and the second wire 37b coupled to the detection electrodes TDL(2) to TDL(n) is coupled to the first ends of the terminals 51(2) to 51(n), respectively.

While the number of terminals 51 according to the present modification is the same as that in the example illustrated in FIGS. 6 and 9, the number of first wires 37a and second wires 37b provided to the peripheral area 10b can be reduced. This configuration can make the peripheral area 10b narrower. The wires arranged outermost out of the first wires 37a and the second wires 37b provided to the peripheral area 10b are more likely to be broken. The first wire 37a and the second wire 37b according to the present modification are arranged outermost in the peripheral area 10b and coupled to the one detection electrode TDL(1). This configuration can secure coupling of the detection electrode TDL(1) to the terminal 51(1) when one of the first wire 37a and the second wire 37b is broken.

The present modification does not necessarily include the first portion 53 and the second portion 54. In this case, the first wire 37a is coupled to the first end of the terminal 51(1), and the second wire 37b is coupled to the second end thereof. Either of the first wire 37a or the second wire 37b is coupled to the first ends of the terminals 51(2) to 51(n).

Third Modification of the First Embodiment

Figure 16:
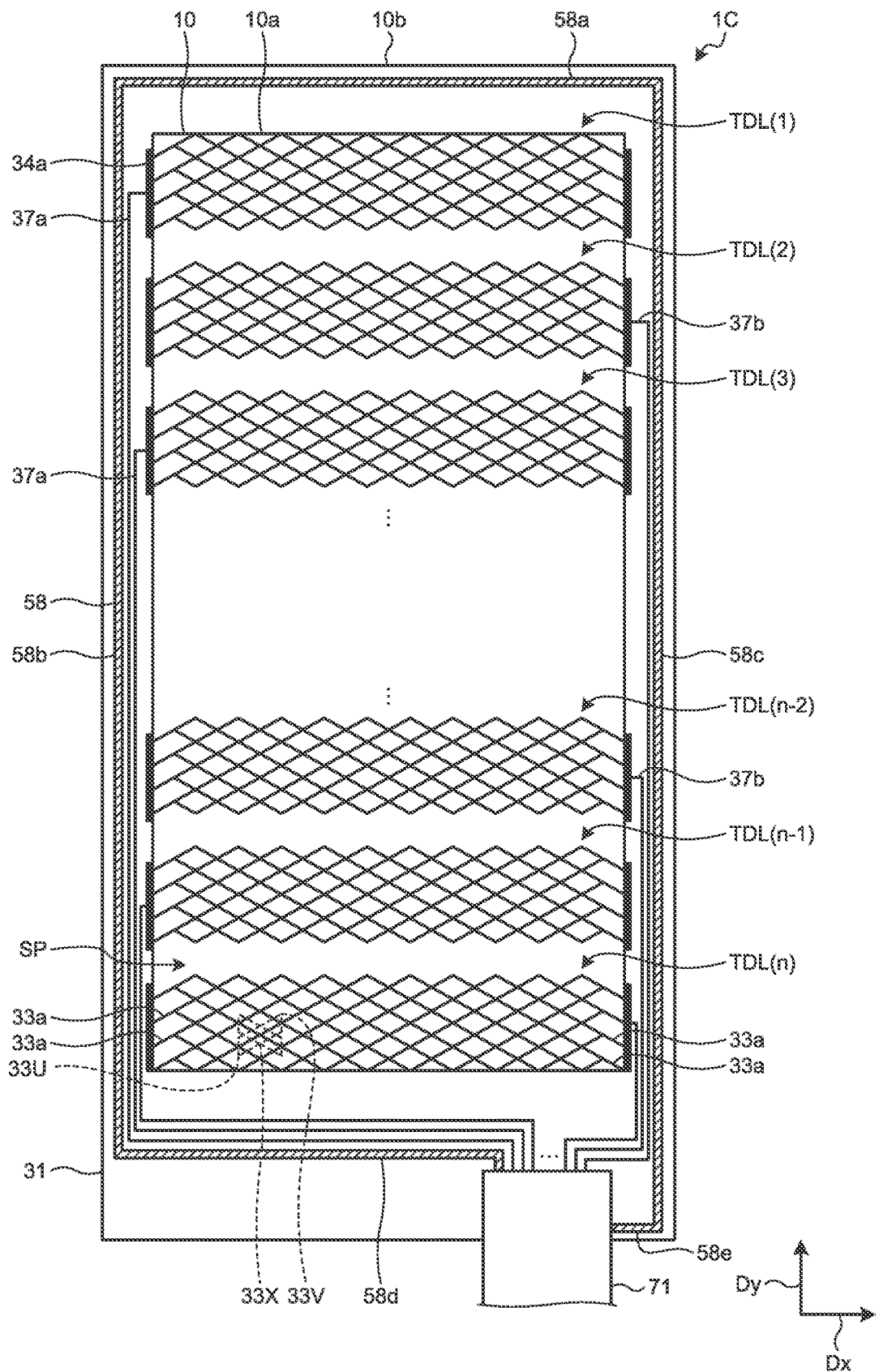
FIG. 16 is a plan view of the second substrate according to a third modification of the first embodiment.

FIG. 16 is a plan view of the second substrate according to a third modification of the first embodiment. As illustrated in FIG. 16, a display apparatus 1C according to the present modification includes a guard ring 58 in the peripheral area 10b of the second substrate 31. The guard ring 58 has a circular shape surrounding the detection electrodes TDL, the first wires 37a, and the second wires 37b. The guard ring 58 has a first portion 58a, a second portion 58b, a third portion 58c, a fourth portion 58d, and a fifth portion 58e.

The first portion 58a is provided along the detection electrode TDL(1). The second portion 58b is coupled to one end of the first portion 58a and arranged along the first wires 37a on the outer side than the first wires 37a. The third portion 58c is arranged along the second wires 37b on the outer side than the second wires 37b. The fourth portion 58d is coupled to an end of the second portion 58b, extends in the first direction Dx, and is coupled to the flexible substrate 71. The fifth portion 58e is coupled to an end of the third portion 58c and coupled to the flexible substrate 71.

The configuration of the terminals 51 is the same as that illustrated in FIG. 15. In other words, the fourth portion 58d of the guard ring 58 is coupled to the first end of the terminal 51(1), and the fifth portion 58e of the guard ring 58 is coupled to the second end thereof. The guard ring 58 is coupled to the ground via the flexible substrate 71 and grounded. Alternatively, the guard ring 58 is supplied with voltage signals having the same electric potential as that supplied to the detection electrodes TDL. This configuration can reduce stray capacitance in the detection electrodes TDL, thereby suppressing reduction in the detection sensitivity.

One end and the other end of the guard ring 58 according to the present modification are coupled to the same one terminal 51. With this configuration, at least one terminal can be omitted. The first wires 37a and the second wires 37b are provided on the inner side of the peripheral area 10b than the guard ring 58. This configuration can suppress breaking of the first wires 37a and the second wires 37b. Either of the first wire 37a or the second wire 37b according to the present modification is coupled to the detection electrodes TDL. The configuration is not limited thereto, and both of the first wire 37a and the second wire 37b may be coupled to the respective detection electrodes TDL.

Fourth Modification of the First Embodiment

Figure 17:
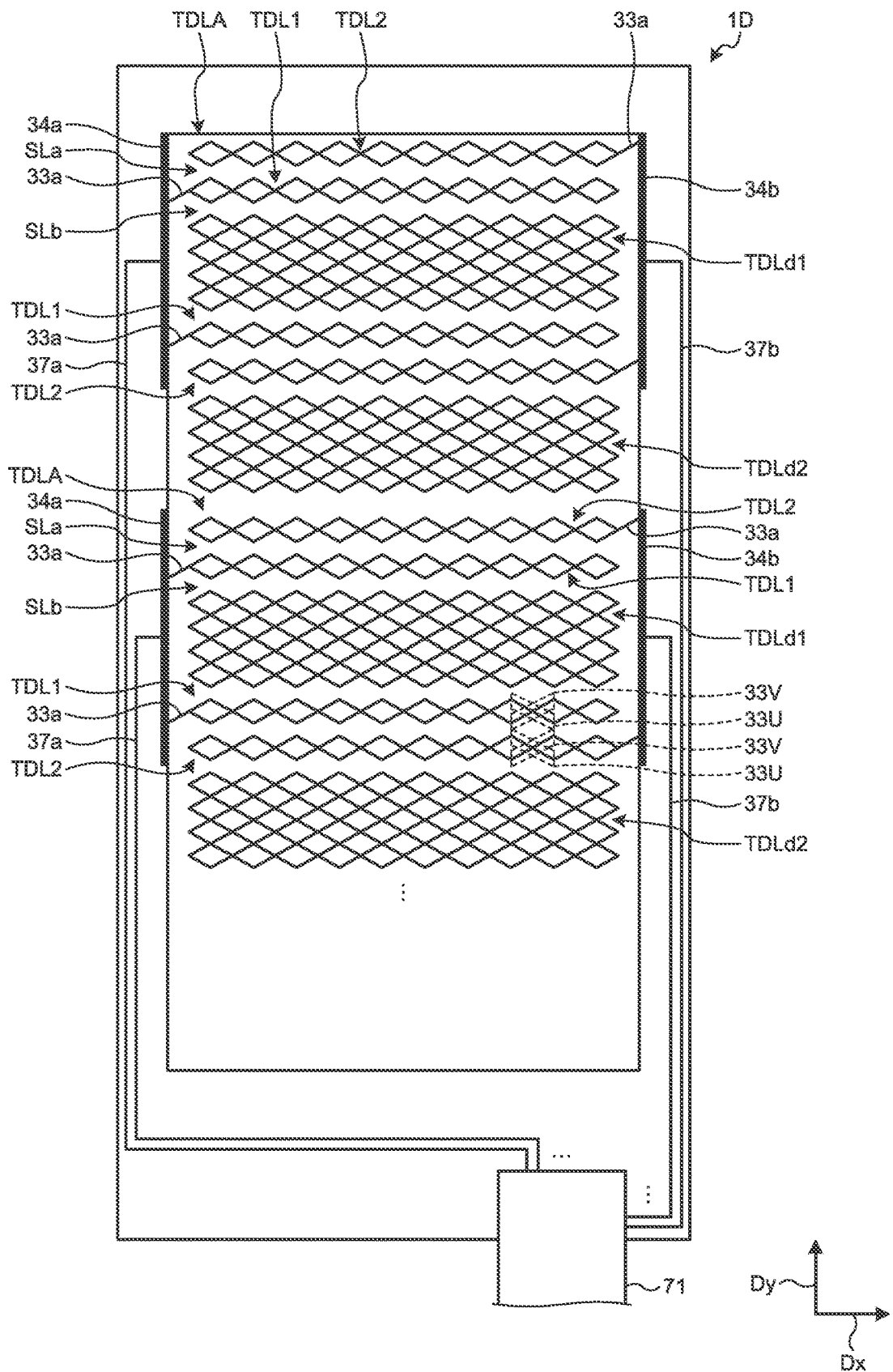
FIG. 17 is a plan view of the second substrate according to a fourth modification of the first embodiment.

FIG. 17 is a plan view of the second substrate according to a fourth modification of the first embodiment. In a display apparatus 1D according to the present modification, detection electrodes TDLA each include first detection electrodes TDL1 and second detection electrodes TDL2. In one detection electrode TDLA, the first detection electrode TDL1 is provided along the first direction Dx and a plurality of first detection electrodes TDL1 are arranged with a gap interposed therebetween in the second direction Dy. The second detection electrode TDL2 is provided along the first direction Dx and arranged away from the respective first detection electrodes TDL1 in the second direction Dy with a slit SLa interposed therebetween. A dummy electrode TDLd1 is arranged between two first detection electrodes TDL1 with a slit SLb interposed therebetween. In the present modification, the second detection electrode TDL2, the first detection electrode TDL1, the dummy electrode TDLd1, the first detection electrode TDL1, and the second detection electrode TDL2 are arranged in this order in the second direction Dy.

The detection electrodes TDLA are arrayed in the second direction Dy. A dummy electrode TDLd2 is provided between the detection electrodes TDLA adjacent to each other in the second direction Dy. The order of arrangement of the electrodes and the number of first detection electrodes TDL1 and second detection electrodes TDL2 in one detection electrode TDLA may be appropriately changed.

The first detection electrode TDL1 and the second detection electrode TDL2 are mesh-like wires each including a plurality of first conductive thin wires 33U and a plurality of second conductive thin wires 33V. The dummy electrode TDLd1 and the dummy electrode TDLd2 are mesh-like wires similar to the first detection electrode TDL1 and the second detection electrode TDL2. The structure of the electrodes is not limited thereto, and the first detection electrode TDL1, the second detection electrode TDL2, the dummy electrode TDLd1, and the dummy electrode TDLd2 may include a plurality of zigzag or wavy metal thin wires, for example.

As illustrated in FIG. 17, in the detection electrode TDLA, the first end of the first detection electrode TDL1 is coupled to the coupling wire 34a via the thin wire 33a. A plurality of first detection electrodes TDL1 are electrically coupled with the coupling wire 34a. The first detection electrodes TDL1 are coupled to the first wire 37a via the coupling wire 34a and electrically coupled to the terminal 51 (refer to FIG. 9). The second end of the first detection electrode TDL1 is not provided with the thin wire 33a and separated from the coupling wire 34b.

In the detection electrode TDLA, the first end of the second detection electrode TDL2 is not provided with the thin wire 33a and separated from the coupling wire 34a. The second end of the second detection electrode TDL2 is coupled to the coupling wire 34b via the thin wire 33a. A plurality of second detection electrodes TDL2 are electrically coupled with the coupling wire 34b. The second detection electrodes TDL2 are coupled to the second wire 37b via the coupling wire 34b and electrically coupled to the terminal 51 (refer to FIG. 9).

With this configuration, the first wire 37a is coupled to the first end of one detection electrode TDLA, and the second wire 37b is coupled to the second end thereof. The first wire 37a and the second wire 37b are coupled to the same one terminal 51 similarly to the example illustrated in FIG. 9. This configuration can secure coupling of the detection electrode TDLA to the terminal 51 when either of the first wire 37a or the second wire 37b is broken. Because the number of terminals 51 is smaller than the number of first wires 37a and second wires 37b, the configuration of the terminals 51 can be simplified. As a result, the configuration of the flexible substrate 71 coupled to the terminals 51 can also be simplified, thereby reducing the cost.

The first detection electrode TDL1 and the second detection electrode TDL2 according to the present modification are electrically coupled to the terminal 51 but separated from each other in the display area 10a. With this configuration, the circular conductor including the terminal 51 (refer to FIG. 9), the first wire 37a, the detection electrode TDLA, the second wire 37b, and the terminal 51 does not have a closed circular form in which all the components are electrically connected in a continuous manner. The circular conductor is open between the first detection electrode TDL1 and the second detection electrode TDL2. This configuration can suppress noise caused by electromagnetic induction.

Second Embodiment

Figure 18:
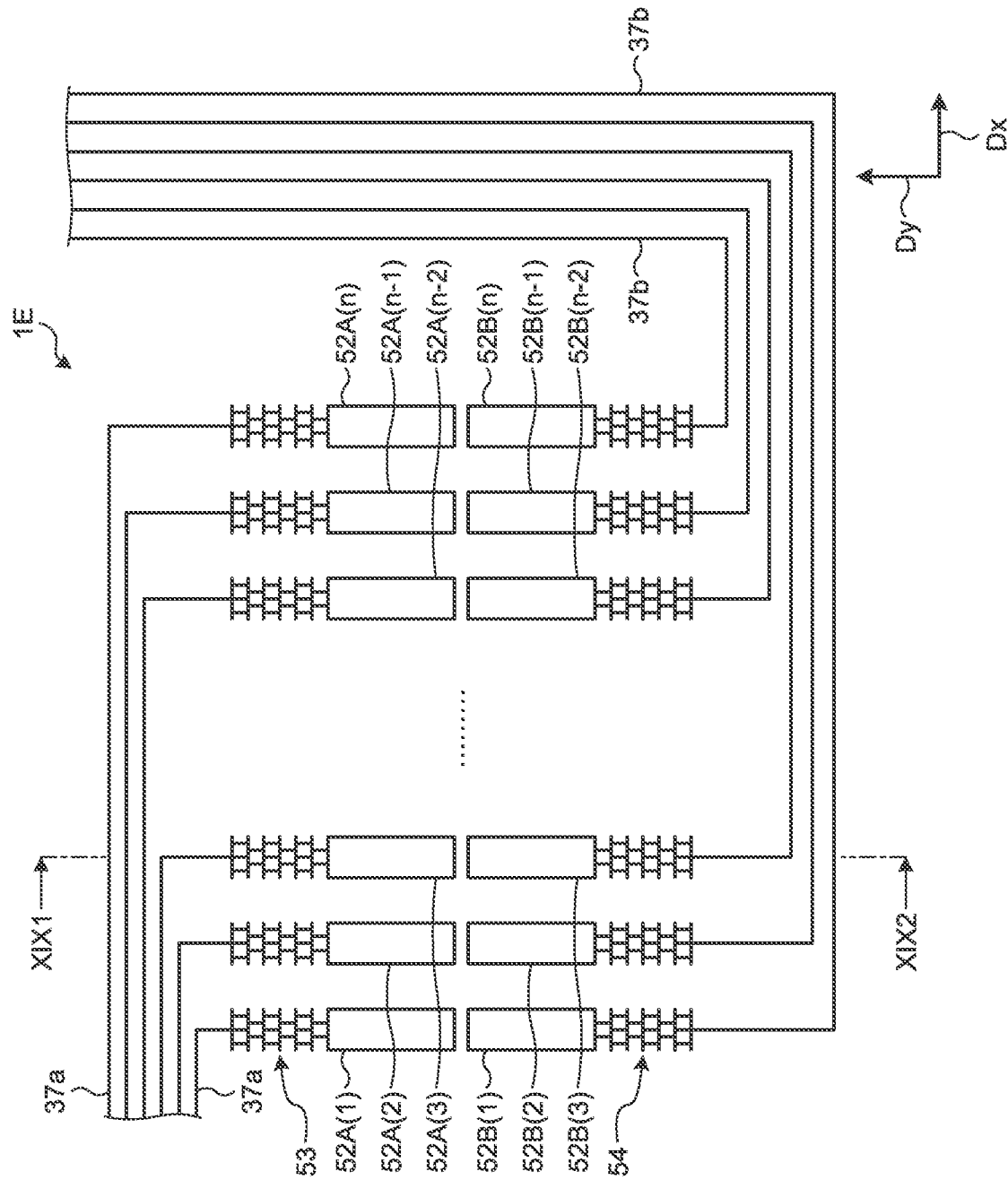
FIG. 18 is a plan view of the terminals according to a second embodiment of the present invention.
Figure 19:
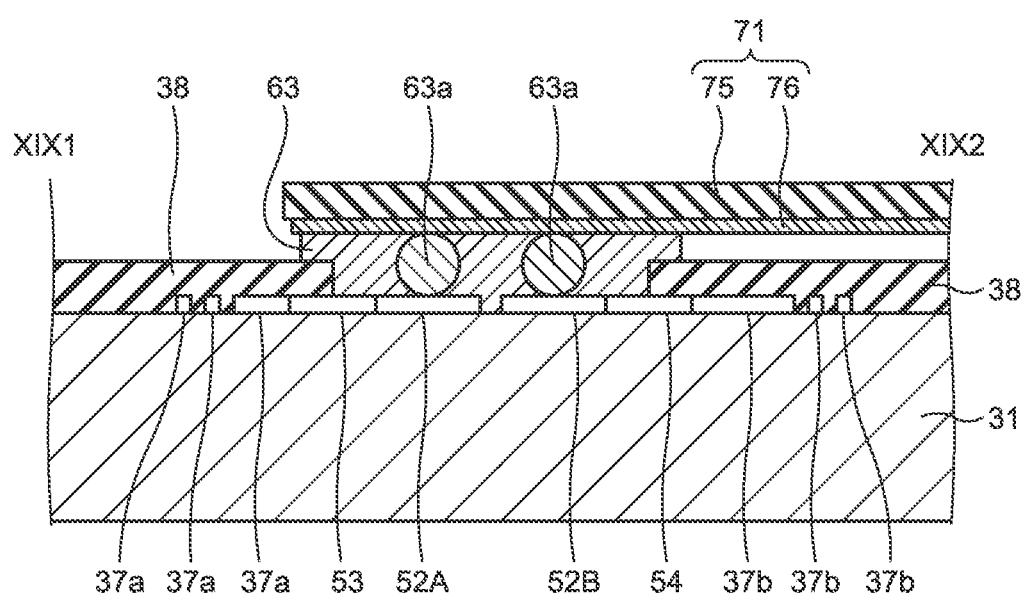
FIG. 19 is a sectional view along line XIX1-XIX2 in FIG. 18.

FIG. 18 is a plan view of the terminals according to a second embodiment of the present invention. FIG. 19 is a sectional view along line XIX1-XIX2 in FIG. 18. In a display apparatus 1E according to the present embodiment, the configuration of the detection electrodes TDL, the first wires 37a, and the second wires 37b is the same as that of the first embodiment illustrated in FIG. 6, for example. The display apparatus 1E includes first terminals 52A(1), 52A(2), 52A(3), 52A(n−2), 52A(n−1), and 52A(n) and second terminals 52B(1), 52B(2), 52B(3), 52B(n−2), 52B(n−1), and 52B(n). The n-th first terminal 52A(n) and the n-th second terminal 52B(n) are for example provided in correspondence with the detection electrode TDL(n). In the following description, the terminals described above are referred to as the first terminals 52A and the second terminals 52B when those need not be distinguished from one another.

The first terminals 52A are arrayed in the first direction Dx. A plurality of second terminals 52B are arrayed in the first direction Dx and face the respective first terminals 52A in the second direction Dy. The first wires 37a coupled to the first ends of the respective detection electrodes TDL are coupled to the respective first terminals 52A via the first portions 53. The first wires 37a are coupled to the first ends of the respective first terminals 52A, that is, the ends on the side opposite to the ends facing the second terminals 52B.

The second wires 37b coupled to the second ends of the respective detection electrodes TDL are coupled to the respective second terminals 52B via the second portions 54. The second wires 37b are coupled to the second ends of the respective second terminals 52B, that is, the ends on the side opposite to the ends facing the first terminals 52A.

With this configuration, the first wire 37a and the second wire 37b coupled to one detection electrode TDL are electrically coupled to a pair of the first terminal 52A and the second terminal 52B, respectively, arranged adjacent to each other in the second direction Dy.

As illustrated in FIG. 19, the coupling terminal 76 of the flexible substrate 71 is arranged facing the first terminal 52A and the second terminal 52B. The protective layer 38 covers the first wires 37a, the second wires 37b, part of the first portion 53, and part of the second portion 54. The first terminal 52A and the second terminal 52B are arranged between facing parts of the protective layer 38. The conductive adhesive 63 covers the first terminal 52A and the second terminal 52B and is arranged overlapping with the ends of the protective layer 38. The first terminal 52A and the second terminal 52B are electrically coupled to the same one coupling terminal 76 via the conductive particles 63a in the conductive adhesive 63. In other words, the first terminal 52A and the second terminal 52B are electrically coupled with the conductive adhesive 63 serving as a multilayered conductive layer. As described above, the first wire 37a and the second wire 37b are electrically coupled via the first terminal 52A, the coupling terminal 76, and the second terminal 52B. In FIG. 19, the conductive particles 63a are provided to the respective terminals of the first terminal 52A and the second terminal 52B. This is given by way of schematic example only, and a number of conductive particles 63a are provided in the actual configuration.

The present embodiment does not necessarily include the first portion 53 and the second portion 54. In this case, the first wire 37a is coupled to the first end of the first terminal 52A, and the second wire 37b is coupled to the second end of the second terminal 52B.

The number of first terminals 52A according to the present embodiment is equal to that of first wires 37a, and the number of second terminals 52B is equal to that of second wires 37b. While the total number of first terminals 52A and second terminals 52B increases compared with the first embodiment, the first terminal 52A and the second terminal 52B are electrically coupled to the same one coupling terminal 76. With this configuration, it is not necessary to increase the number of coupling terminals 76 of the flexible substrate 71 or to electrically couple the first wires 37a and the second wires 37b in the flexible substrate 71. Consequently, the configuration of the flexible substrate 71 can be simplified.

The first wire 37a and the second wire 37b according to the present embodiment are coupled to one detection electrode TDL. This configuration can increase the reliability of coupling between the detection electrodes TDL and the flexible substrate 71. The first terminal 52A is electrically coupled to the first end of one detection terminal TDL via the first wire 37a, and the second terminal 52B is coupled to the second end thereof via the second wire 37b. With this configuration, the first terminal 52A and the second terminal 52B can be used as terminals for an electrical characteristics inspection, such as a resistance inspection, for the first wire 37a and the second wire 37b. By bringing a probe of a measuring instrument into contact with the first terminal 52A and the second terminal 52B when the flexible substrate 71 is not coupled thereto, for example, a resistance inspection and a breaking inspection can be performed on the wires. An example of the method for inspecting electrical characteristics will be described later.

Third Embodiment

Figure 20:
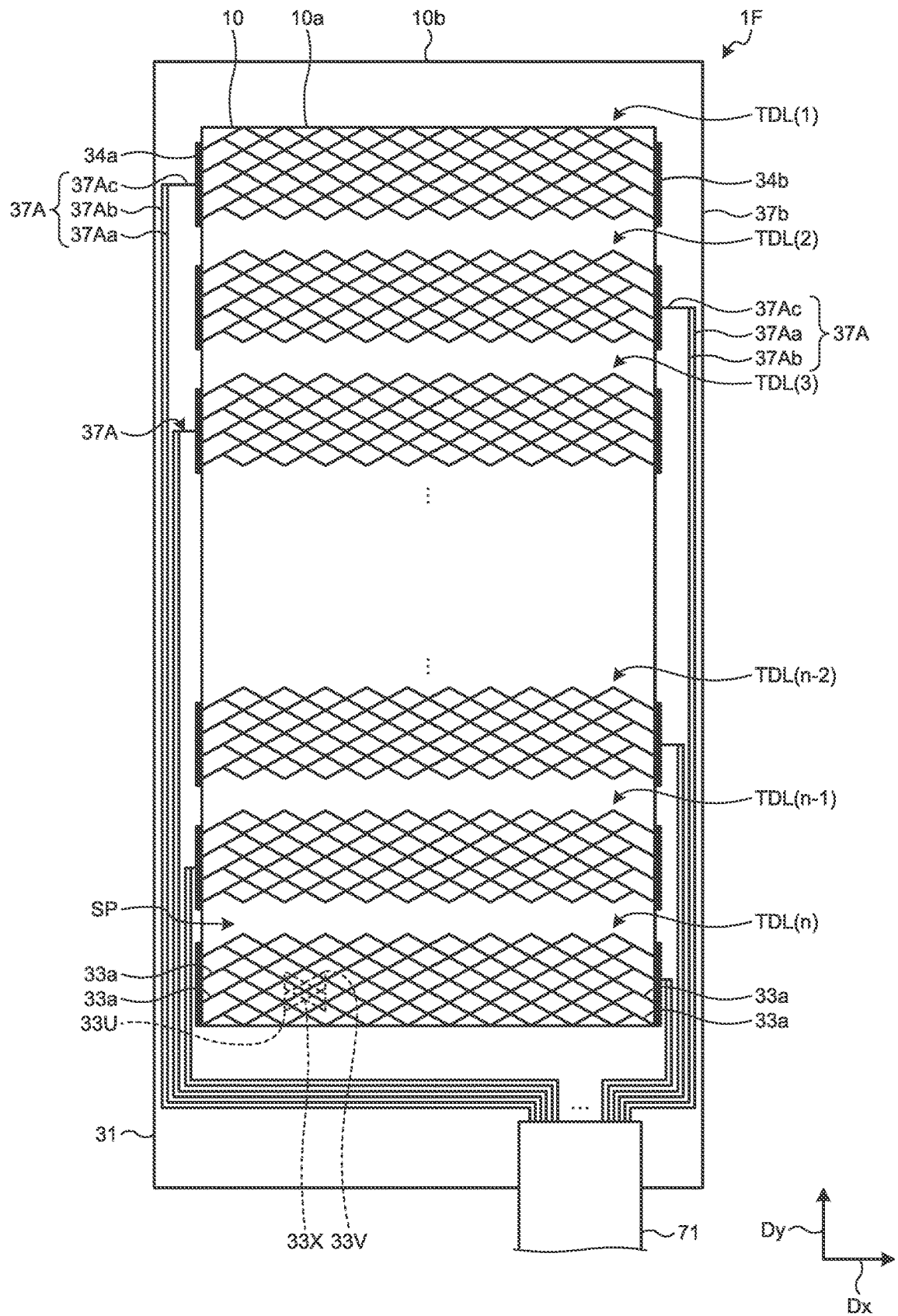
FIG. 20 is a plan view of the second substrate according to a third embodiment of the present invention.
Figure 21:
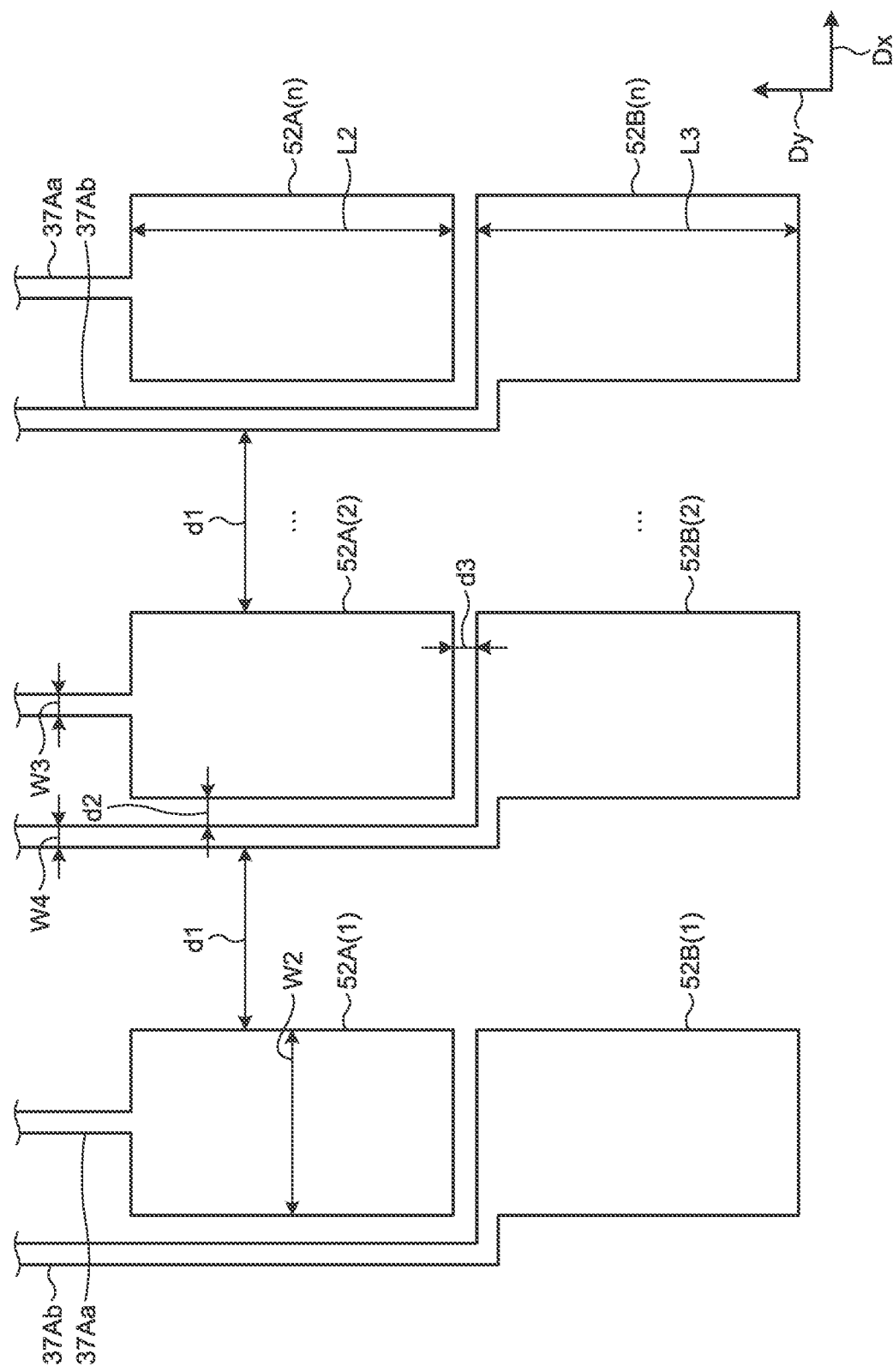
FIG. 21 is a plan view of the terminals according to the third embodiment.

FIG. 20 is a plan view of the second substrate according to a third embodiment of the present invention. FIG. 21 is a plan view of the terminals according to the third embodiment. In a display apparatus 1F according to the present embodiment, wires 37A are coupled to one of the ends of the detection electrodes TDL extending in the first direction Dx. The wires 37A each include a first wire 37Aa, a second wire 37Ab, and a coupling portion 37Ac. The coupling portion 37Ac is coupled to the coupling wire 34a or the coupling wire 34b of the detection electrode TDL. The first wire 37Aa is coupled to the coupling portion 37Ac and provided along the peripheral area 10b. The second wire 37Ab is coupled to the same coupling portion 37Ac to which the first wire 37Aa is coupled, and provided along the first wire 37Aa.

The configuration of the detection electrodes TDL is the same as that illustrated in FIG. 6. The detection electrode TDL extends in the first direction Dx and a plurality of detection electrodes TDL are arrayed in the second direction Dy. The wires 37A are arranged in a manner alternately coupled to the ends of the detection electrodes TDL arrayed in the second direction Dy. The wires 37A, for example, are coupled to the first ends of the detection electrodes TDL(1), TDL(3), . . . , and TDL(n−1) via the respective coupling wires 34a. The wires 37A are coupled to the second ends of the detection electrodes TDL(2), TDL(n−2), and TDL(n) via the respective coupling wires 34b.

As described above, the first wire 37Aa and the second wire 37Ab are coupled to the first end or the second end of one detection terminal TDL. This configuration can increase the reliability of coupling between the detection electrodes TDL and the flexible substrate 71.

As illustrated in FIG. 21, the first terminals 52A(1), 52A(2), . . . , and 52A(n) are arrayed in the first direction Dx. The second terminals 52B(1), 52B(2), . . . , and 52B(n) are arranged adjacent to the first terminals 52A(1), 52A(2), . . . , and 52A(n), respectively, in the second direction Dy. As illustrated in FIG. 20, the positions of the detection electrodes TDL to which the wires 37A are coupled are alternately shifted. With this configuration, the first terminal 52A(1) and the second terminal 52B(1), for example, correspond to the detection electrode TDL(1) illustrated in FIG. 20. The first terminal 52A(2) and the second terminal 52B(2) correspond to the detection electrode TDL(3) illustrated in FIG. 20. The first terminal 52A(n) and the second terminal 52B(n) correspond to the detection electrode TDL(2) illustrated in FIG. 20.

The first wire 37Aa is coupled to the first end of the first terminal 52A. The second end of the first terminal 52A faces the first end of the second terminal 52B. The second wire 37Ab is provided along one side of the first terminal 52A and coupled to the first end of the second terminal 52B. The second wire 37Ab coupled to the detection electrode TDL(3) illustrated in FIG. 20, for example, passes through a gap between the first terminal 52A(1) and the first terminal 52A(2) adjacent to each other in the first direction Dx and is coupled to the second terminal 52B(2).

Similarly to the example illustrated in FIG. 19, the first terminal 52A and the second terminal 52B are coupled to the same one coupling terminal 76 of the flexible substrate 71. With this configuration, the first wire 37Aa and the second wire 37Ab are electrically coupled via the first terminal 52A, the coupling terminal 76, and the second terminal 52B. The conductive adhesive 63 according to the present embodiment covers not only the first terminals 52A and the second terminals 52B but also the second wires 37Ab positioned between the first terminals 52A. With the ACF used as the conductive adhesive 63, the second wire 37Ab and the first terminal 52A are not electrically connected. The second wire 37Ab and the first terminal 52A are electrically connected via the coupling terminal 76 of the flexible substrate 71. The first terminal 52A and the second terminal 52B are electrically coupled with the conductive adhesive 63 serving as a multilayered conductive layer.

A width W2 of the first terminal 52A is 150 µm, for example. A length L2 of the first terminal 52A and a length L3 of the second terminal 52B in the second direction Dy are 150 µm to 200 µm, specifically 175 µm, for example. A width W3 of the first wire 37Aa and a width W4 of the second wire 37Ab are 5 µm, for example. A distance d1 between the first terminal 52A and the second wire 37Ab in the first direction Dx is 50 µm, for example. A distance d2 between the first terminal 52A and the second wire 37Ab in the first direction Dx is 5 µm, for example. A distance d3 between the first terminal 52A and the second terminal 52B in the second direction Dy is 5 µm, for example.

With this configuration, the first terminal 52A is electrically coupled to the second terminal 52B via the first wire 37Aa, the detection electrode TDL, and the second wire 37Ab when the flexible substrate 71 is not coupled to the first terminal 52A and the second terminal 52B. Also in the present embodiment, the first terminal 52A and the second terminal 52B can be used as terminals for an electrical characteristics inspection for the first wire 37Aa and the second wire 37Ab.

The present embodiment may include the first portion 53 and the second portion 54. In this case, the first wire 37Aa is coupled to the first end of the first terminal 52A via the first portion 53, and the second wire 37Ab is coupled to the first end of the second terminal 52B via the second portion 54.

Fourth Embodiment

Figure 22:
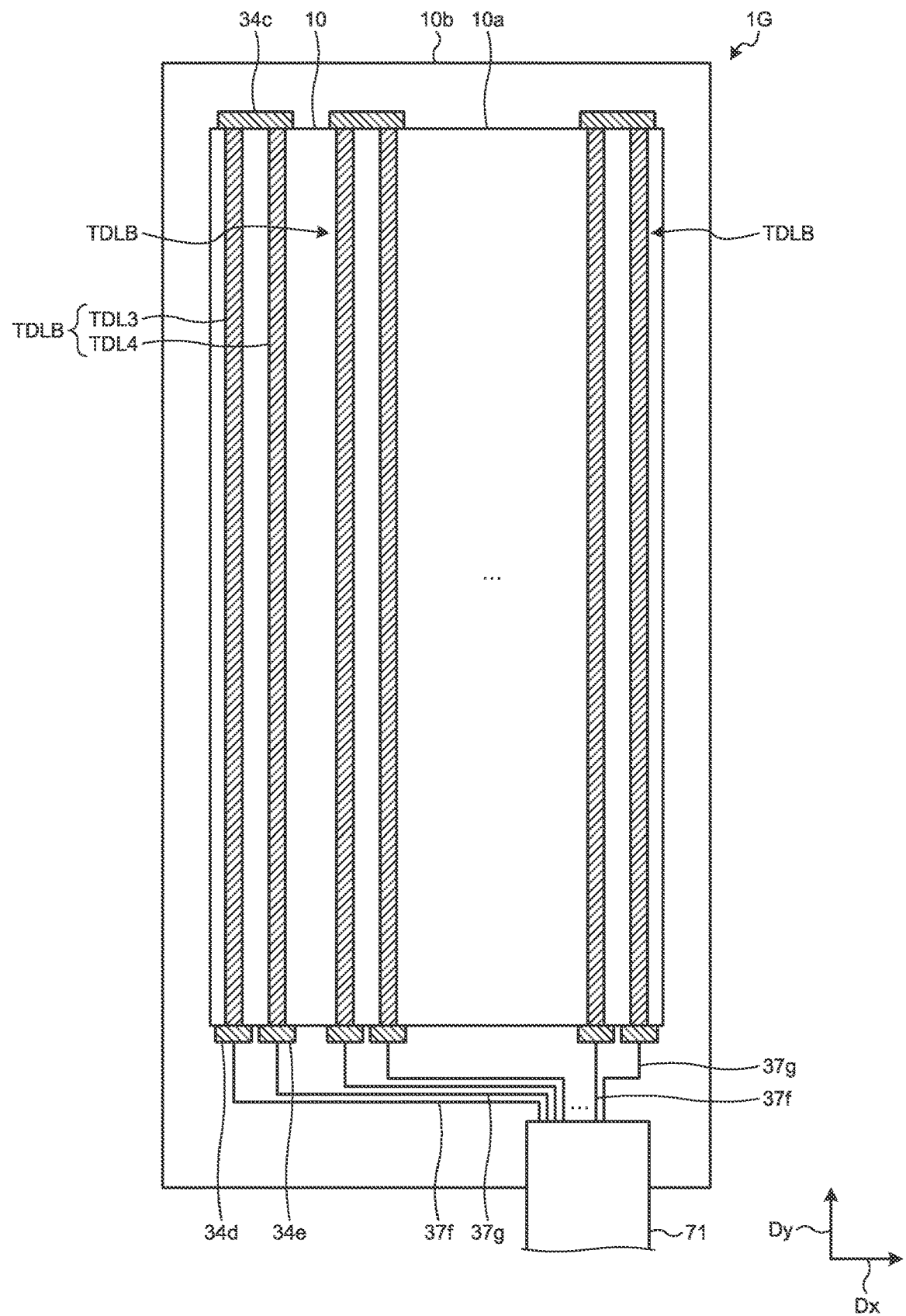
FIG. 22 is a plan view of the second substrate according to a fourth embodiment of the present invention.
Figure 23:
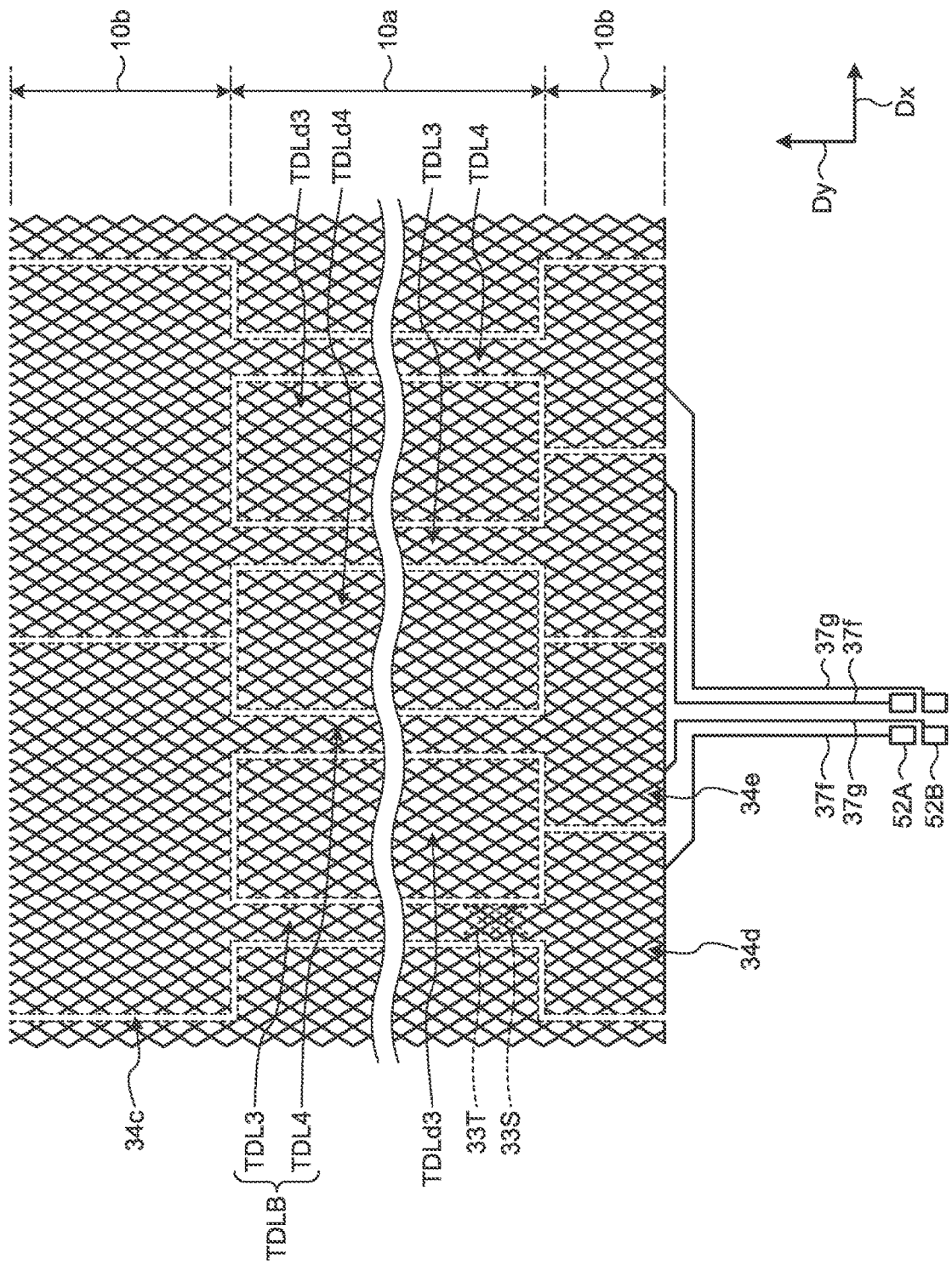
FIG. 23 is a plan view of detection electrodes according to the fourth embodiment.

FIG. 22 is a plan view of the second substrate according to a fourth embodiment of the present invention. FIG. 23 is a plan view of the detection electrodes according to the fourth embodiment. As illustrated in FIG. 22, detection electrodes TDLB in a display apparatus 1G according to the present embodiment each include a third detection electrode TDL3 and a fourth detection electrode TDL4. The third detection electrode TDL3 extends in the second direction Dy. The fourth detection electrode TDL4 is provided along the third detection electrode TDL3. The first end of the third detection electrode TDL3 is coupled to the first end of the fourth detection electrode TDL4 via a coupling wire 34c. The second end of the third detection electrode TDL3 is coupled to a first wire 37f via a coupling wire 34d. The second end of the fourth detection electrode TDL4 is coupled to a second wire 37g via a coupling wire 34e.

As described above, one detection electrode TDLB has a U-shape as a whole including the coupling wire 34d, the third detection electrode TDL3, the coupling wire 34c, the fourth detection electrode TDL4, and the coupling wire 34e. One detection electrode TDLB extends in the second direction Dy as a whole. A plurality of detection electrodes TDLB are arrayed in the first direction Dx. The present embodiment further includes the drive electrode COML illustrated in FIG. 5, which is not illustrated in FIG. 22, extending in the first direction Dx and a plurality of drive electrodes COML are arrayed in the second direction Dy. In other words, the drive electrodes COML are provided along the gate lines GCL illustrated in FIG. 8.

As illustrated in FIG. 23, the third detection electrode TDL3 is a mesh-like wire including a plurality of third conductive thin wires 33S and a plurality of fourth conductive thin wires 33T. The third conductive thin wires 33S and the fourth conductive thin wires 33T extend in different directions. The third conductive thin wires 33S and the fourth conductive thin wires 33T are made of the same material as that of the first conductive thin wires 33U and the second conductive thin wires 33V. Similarly to the third detection electrode TDL3, the fourth detection electrode TDL4 is a mesh-like wire including the third conductive thin wires 33S and the fourth conductive thin wires 33T.

The coupling wires 34c, 34d, and 34e are mesh-like wires having a plurality of conductive thin wires similarly to the third detection electrode TDL3 and the fourth detection electrode TDL4.

While the coupling wires 34c, 34d, and 34e are provided to the peripheral area 10b, the configuration is not limited thereto. Part or the whole of the coupling wires 34c, 34d, and 34e may be provided to the display area 10a. The coupling wires 34c, 34d, and 34e may have functions as detection electrodes.

In one detection electrode TDLB, a dummy electrode TDLd3 is provided in the area surrounded by the third detection electrode TDL3, the fourth detection electrode TDL4, and the coupling wires 34c, 34d, and 34e. A dummy electrode TDLd4 is provided between adjacent detection electrodes TDLB. The dummy electrodes TDLd3 and TDLd4 are mesh-like wires having a plurality of conductive thin wires similarly to the third detection electrode TDL3 and the fourth detection electrode TDL4. This configuration can suppress variations in the translucency in the display area 10a and provide high visibility.

The third detection electrode TDL3, the fourth detection electrode TDL4, the coupling wires 34c, 34d, and 34e, and the dummy electrodes TDLd3 and TDLd4 may include a plurality of zigzag or wavy metal thin wires.

The first wire 37f according to the present embodiment is coupled to the first terminal 52A, and the second wire 37g is coupled to the second terminal 52B. Similarly to the example illustrated in FIG. 19, the first terminal 52A and the second terminal 52B are coupled to the one coupling terminal 76 via the conductive adhesive 63. With this configuration, the third detection electrode TDL3 and the fourth detection electrode TDL4 are electrically coupled via the first terminal 52A, the coupling terminal 76, and the second terminal 52B. Consequently, the first terminal 52A and the second terminal 52B can be used as terminals for an electrical characteristics inspection when the flexible substrate 71 is not coupled thereto.

The present embodiment may include the first portion 53 and the second portion 54. In this case, the first wire 37f is coupled to the first end of the first terminal 52A via the first portion 53, and the second wire 37g is coupled to the first end of the second terminal 52B via the second portion 54.

Fifth Embodiment

Figure 24:
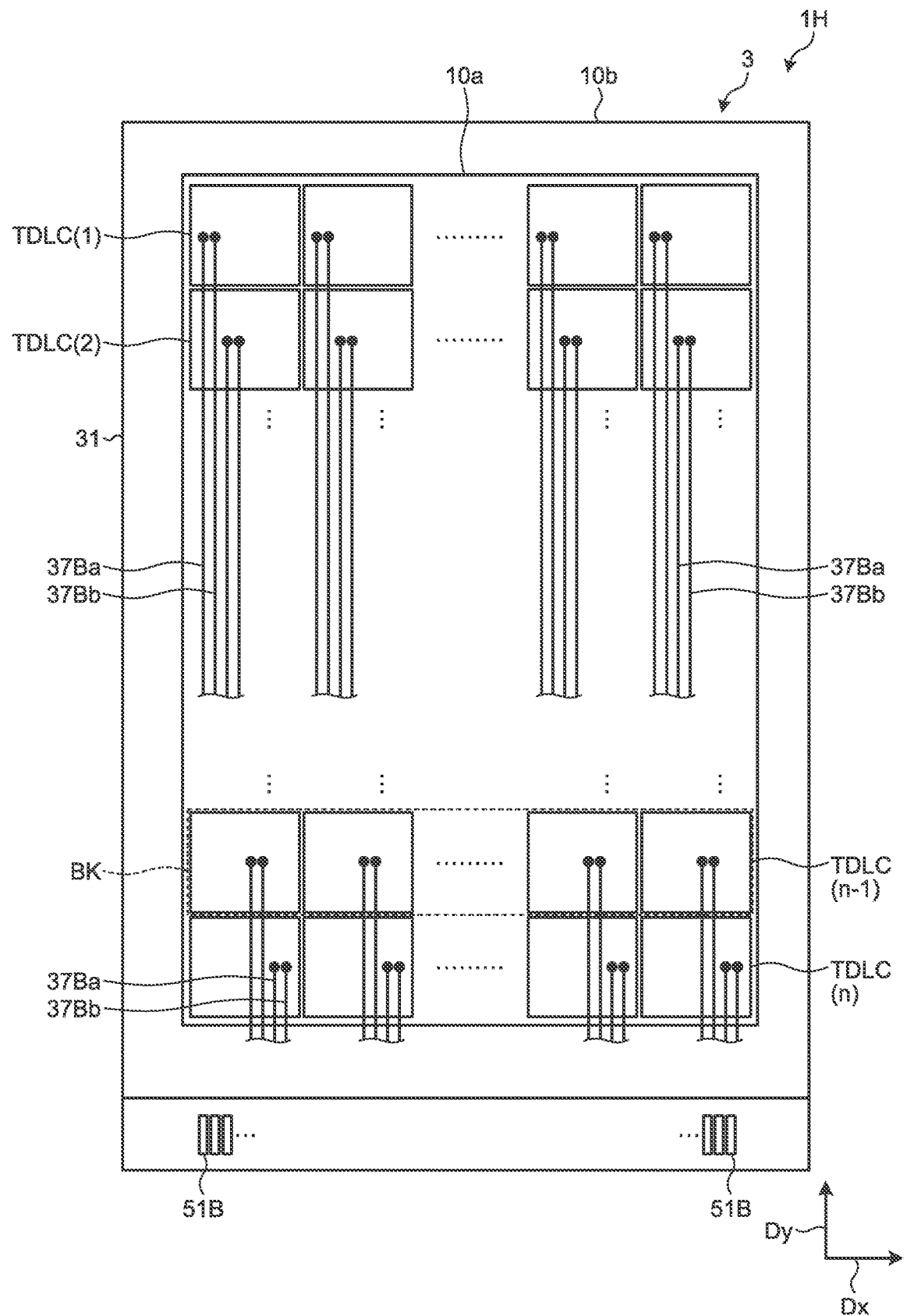
FIG. 24 is a plan view of the second substrate according to a fifth embodiment of the present invention.
Figure 25:
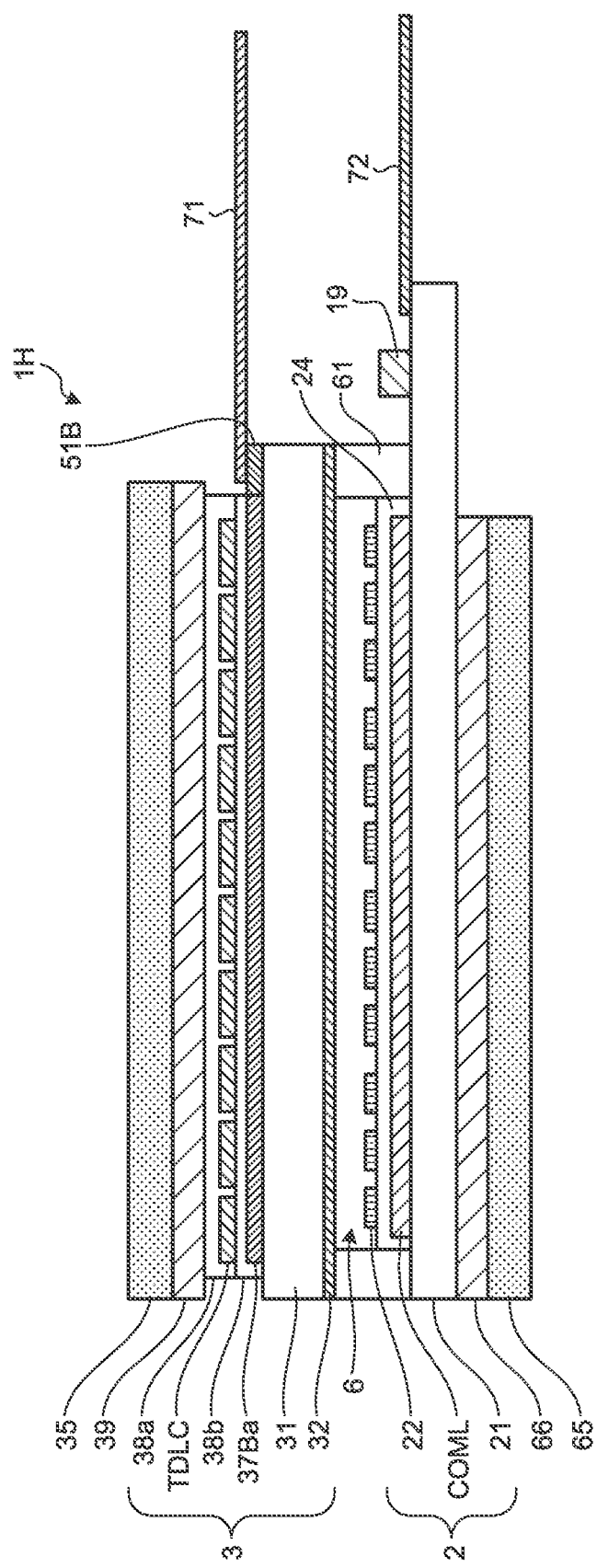
FIG. 25 is a sectional view of a schematic sectional structure of the display apparatus according to the fifth embodiment.
Figure 26:
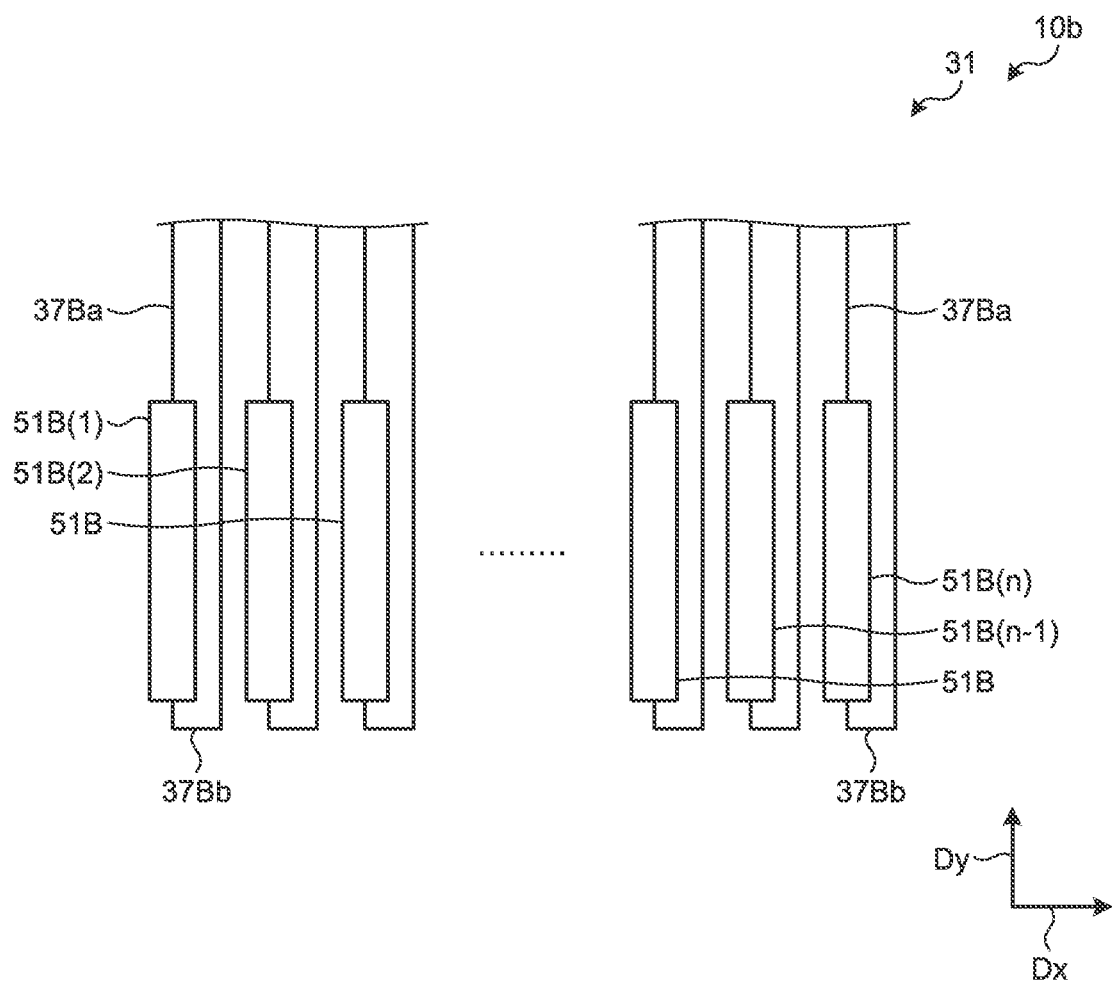
FIG. 26 is a plan view of the terminals according to the fifth embodiment.

FIG. 24 is a plan view of the second substrate according to a fifth embodiment of the present invention. FIG. 25 is a sectional view of a schematic sectional structure of the display apparatus according to the fifth embodiment. FIG. 26 is a plan view of the terminals according to the fifth embodiment.

As illustrated in FIG. 24, a display apparatus 1H according to the present embodiment includes a plurality of rectangular detection electrodes TDLC(1), (2), . . . , (n−1), and (n), first wires 37Ba, and second wires 37Bb. In the following description, the detection electrodes TDLC(1), (2), . . . , (n−1), and (n) are referred to as the detection electrodes TDLC when those need not be distinguished from one another. The detection electrodes TDLC are arranged in a matrix (row-column configuration) in the display area 10a of the second substrate 31. In other words, the detection electrodes TDLC are arrayed in the first direction Dx and the second direction Dy. As illustrated in FIG. 24, pairs of the first wire 37Ba and the second wire 37Bb are coupled to the respective detection electrodes TDLC. The pairs of the first wire 37Ba and the second wire 37Bb are extracted to the peripheral area 10b and coupled to respective terminals 51B. The detection electrodes TDLC are made of a translucent conductive material, such as ITO.

The display apparatus 1H according to the present embodiment performs detection based on the basic principle of self-capacitance touch detection described above. In this case, when the drive signals Vcom are supplied to the respective detection electrodes TDLC via the first wires 37Ba and the second wires 37Bb, the detection electrodes TDLC output the detection signals Vdet based on a change in capacitance of the detection electrodes TDLC to the detection device 40. The detection is performed on the detection electrodes TDLC arranged in a matrix (row-column direction), whereby the coordinate extractor 45 can detect the touch coordinates.

The detection may be performed on the detection electrodes TDLC simultaneously or in a predetermined order. As illustrated in FIG. 24, a plurality of detection electrodes TDLC arrayed in the first direction Dx may be determined to be a detection electrode block BK, and the detection may be collectively performed on the detection electrode block BK. In this case, the detection electrode block BK may serve as one detection electrode, thereby performing the mutual capacitance touch detection described above.

As illustrated in FIG. 25, the first wires 37Ba are provided on the side closer to the second substrate 31 than the detection electrodes TDLC with an insulating layer 38b interposed therebetween. The detection electrodes TDLC are covered with an insulating layer 38a. The first wires 37Ba are electrically coupled to the respective detection electrodes TDLC via contact holes formed in the insulating layer 38b. While the second wires 37Bb are not illustrated in FIG. 25, those are provided to the same layer as that of the first wires 37Ba. The second wires 37Bb are electrically coupled to the respective detection electrodes TDLC via contact holes formed in the insulating layer 38b.

The configuration is not limited thereto, and the first wires 37Ba and the second wires 37Bb may be provided to a layer farther from the second substrate 31 than the detection electrodes TDLC. Alternatively, the first wires 37Ba and the second wires 37Bb may be provided to the same layer as that of the detection electrodes TDLC.

As illustrated in FIG. 26, a plurality of terminals 51B are provided in correspondence with the respective detection electrodes TDLC in the peripheral area 10b. The terminals 51B each have a rectangular shape the long side of which extends along the second direction Dy and are arrayed in the first direction Dx. The detection electrodes TDLC and the terminals 51B are provided in one-to-one correspondence. As illustrated in FIG. 24, the terminal 51B(1) is, for example, provided in correspondence with the detection electrode TDLC(1). Similarly, the terminal 51B(2) is provided in correspondence with the detection electrode TDLC (2), the terminal 51B(n−1) is provided in correspondence with the detection electrode TDLC(n−1), and the terminal 51B(n) is provided in correspondence with the detection electrode TDLC(n). The terminals 51B(1), 51B(2), 51B(n−1), and 51B(n) are referred to as the terminals 51B when those need not be distinguished from one another.

Also in the present embodiment, the first wire 37Ba and the second wire 37Bb coupled to one detection electrode TDLC are coupled to the same one terminal 51B. The first wires 37Ba, for example, are coupled to the first ends of the respective terminals 51B, and the second wires 37Bb are coupled to the second ends of the respective terminals 51B. The first wire 37Ba and the second wire 37Bb coupled to the detection electrode TDLC (1), for example, are coupled to the first end and the second end, respectively, of the terminal 51B(1). This configuration is also employed for the detection electrodes TDLC(2) to TDLC(n). While the first wires 37Ba and the second wires 37Bb are arranged in the display area 10a in FIG. 24, part of them may be arranged in the peripheral area 10b.

With this configuration, the first wire 37Ba and the second wire 37Bb coupled to the detection electrode TDLC are electrically coupled to the coupling terminal 76 of the flexible substrate 71 (refer to FIG. 10) via the same one terminal 51B. With this configuration, the number of terminals 51B is smaller than the total number of first wires 37Ba and second wires 37Bb. When one of the first wire 37Ba and the second wire 37Bb coupled to the same terminal 51B is broken, the other thereof remains coupled to the terminal 51B. This configuration can prevent the wires from being completely broken between the detection electrode TDLC and the terminal 51B.

The present embodiment may include the first portion 53 and the second portion 54 (refer to FIG. 12). In this case, the first wire 37Ba is coupled to the first end of the first terminal 51B via the first portion 53, and the second wire 37Bb is coupled to the second end of the first terminal 51B via the second portion 54.

Figure 27:
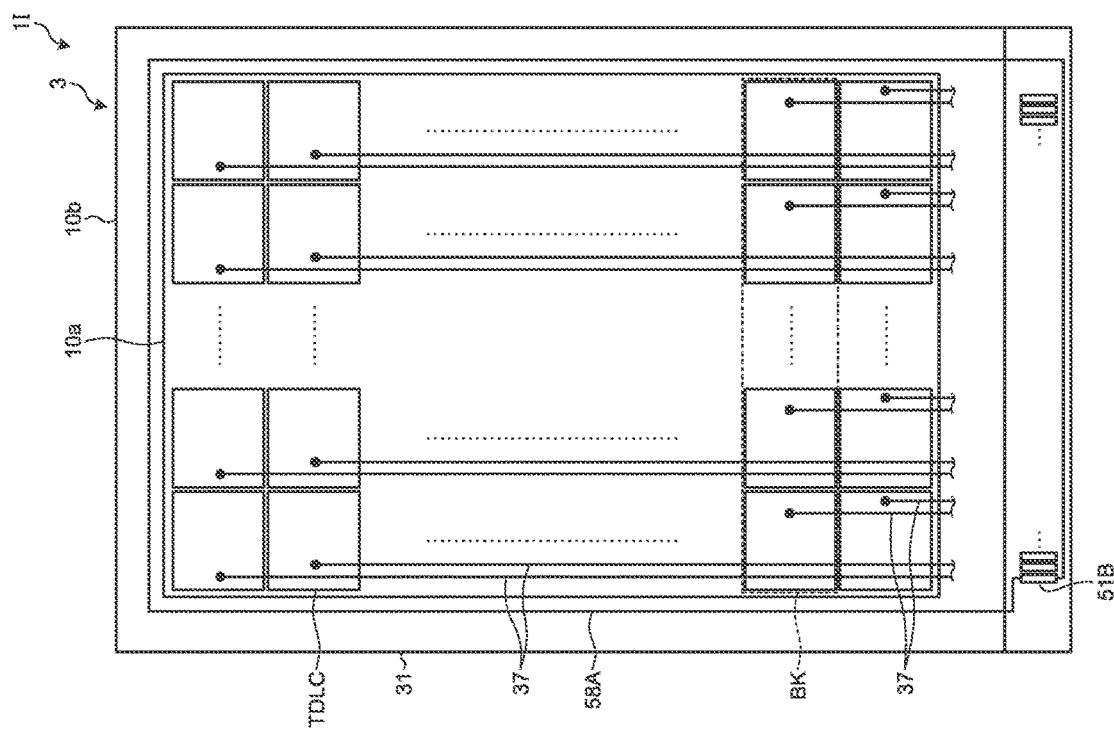
FIG. 27 is a plan view of the second substrate according to a modification of the fifth embodiment.

FIG. 27 is a plan view of the second substrate according to a modification of the fifth embodiment. As illustrated in FIG. 27, a display apparatus 1I according to the present modification includes a guard ring 58A in the peripheral area 10b of the second substrate 31. The guard ring 58A has a circular shape surrounding the detection electrodes TDLC, wires 37, and the terminals 51B. One end and the other end of the guard ring 58A are coupled to one terminal 51B. The guard ring 58A, for example, is electrically coupled to the ground via the flexible substrate 71 and grounded.

One end and the other end of the guard ring 58A according to the present modification are coupled to the same one terminal 51B. With this configuration, at least one terminal can be omitted. The wires 37 are provided on the inner side than the guard ring 58A. This configuration can suppress breaking of the wires 37. The wires 37 according to the present modification are coupled to the respective detection electrodes TDLC. The wires 37 are extracted to the peripheral area 10b and coupled to the respective terminals 51B. The configuration is not limited thereto, and the pairs of the first wire 37Ba and the second wire 37Bb may be coupled to the respective detection electrodes TDLC as illustrated in FIG. 24.

Resistance Inspection Method

Figure 28:
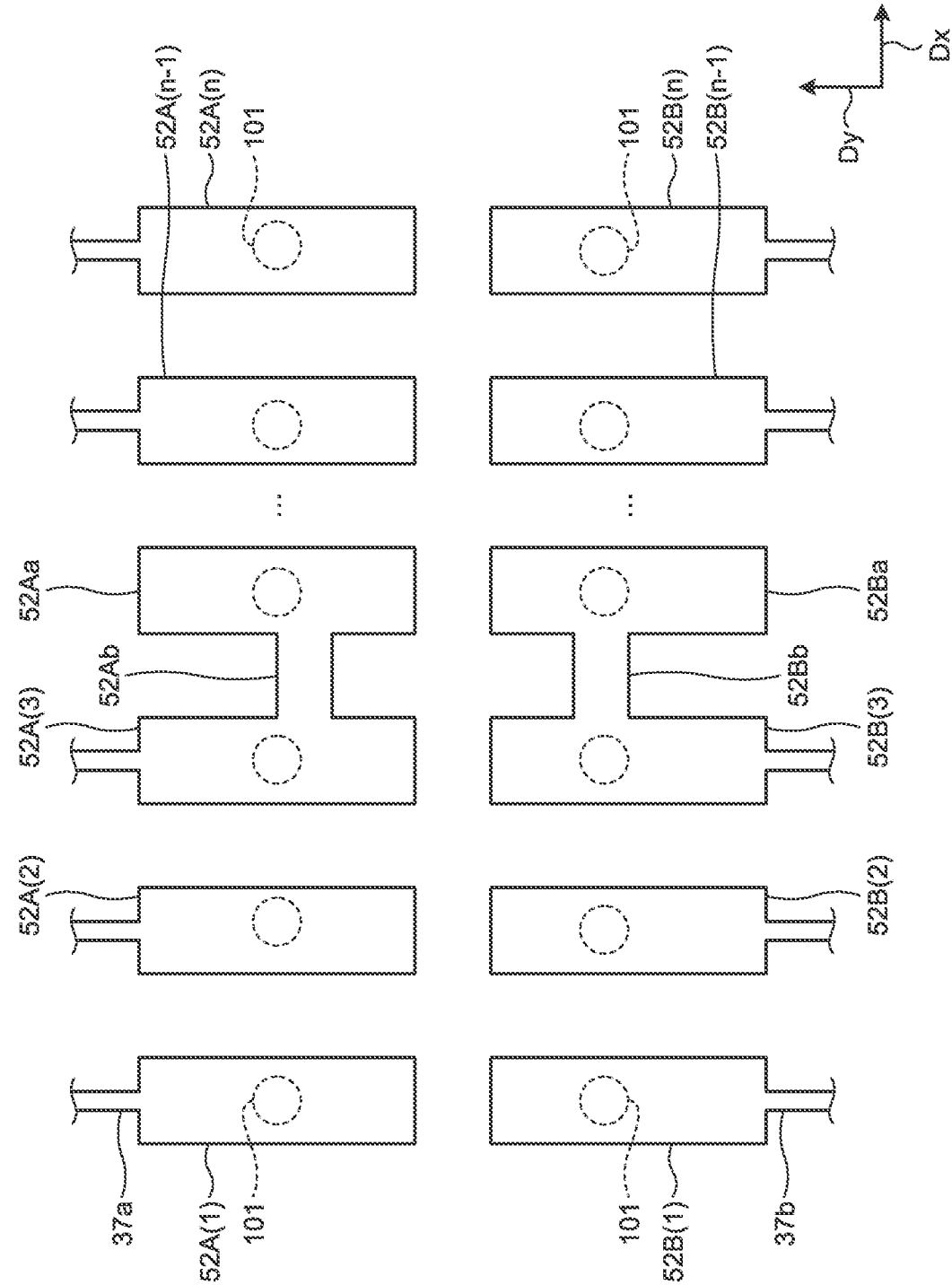
FIG. 28 is a diagram for explaining an example of a resistance inspection method for the display apparatus.
Figure 29:
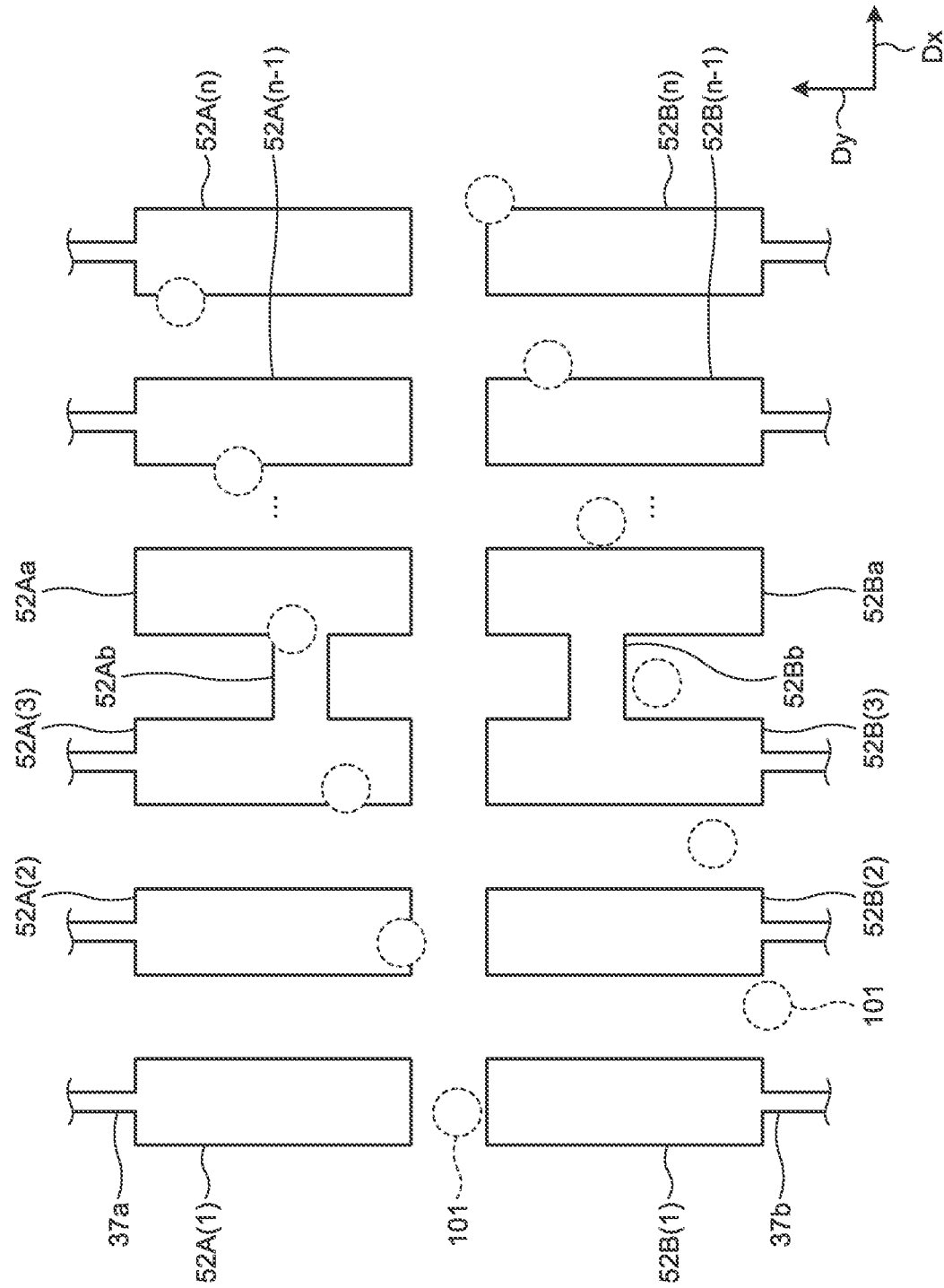
FIG. 29 is a diagram for explaining detection of deviation.
Figure 30:
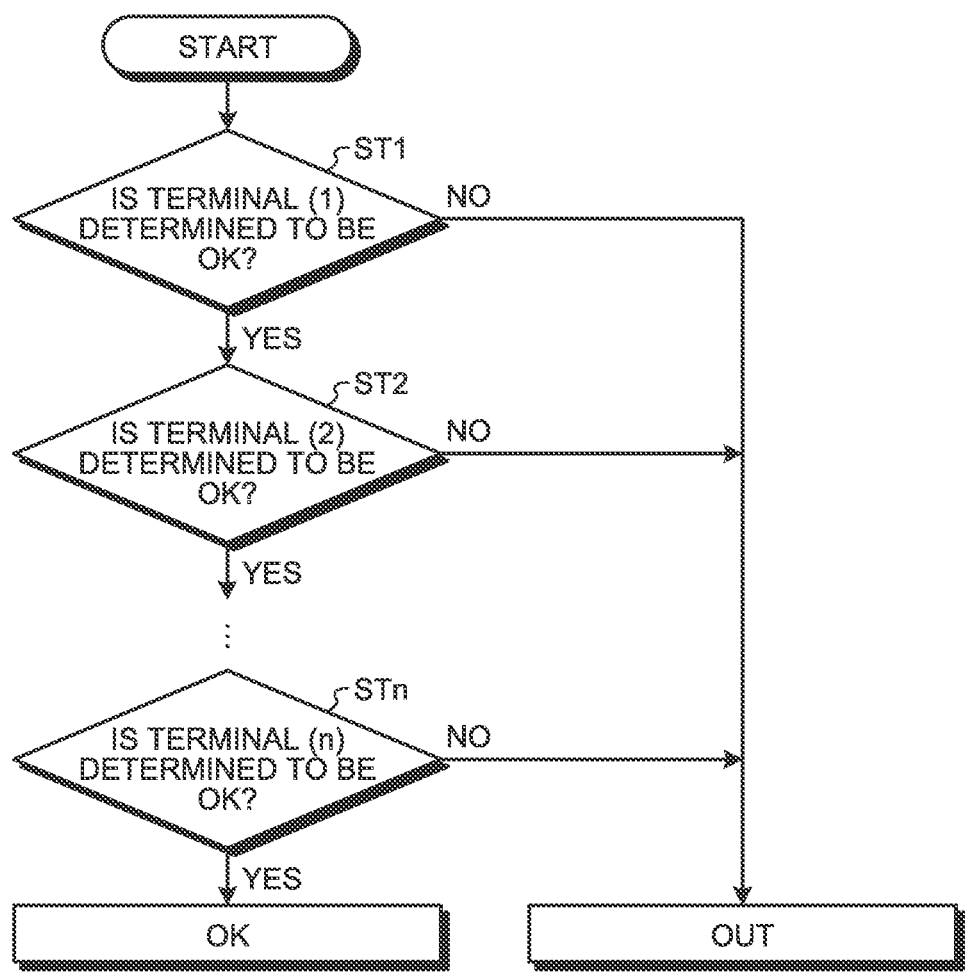
FIG. 30 is a flowchart of an example of the resistance inspection method.

The following describes an example of a resistance inspection method using the first terminals 52A and the second terminals 52B. FIG. 28 is a diagram for explaining an example of the resistance inspection method for the display apparatus. FIG. 29 is a diagram for explaining detection of deviation. FIG. 30 is a flowchart of an example of the resistance inspection method. FIG. 31 is a table of an example of resistance inspection items and determination results.

As illustrated in FIG. 28, the electric resistance between the first terminal 52A and the second terminal 52B facing each other is measured by bringing a detection probe 101 of a resistance measurement apparatus into contact with the first terminal 52A and the second terminal 52B. In other words, the total of resistances of the first wire 37a, the detection electrode TDL (refer to FIG. 6 and other figures), and the second wire 37b are measured. In the first terminals 52A and the second terminals 52B illustrated in FIG. 28, the second wires 37b are coupled to the second ends of the respective second terminals 52B, that is, the ends on the side opposite to the ends facing the first terminals 52A as described in the second embodiment. The configuration is not limited thereto. Similarly, the resistance inspection may be performed on the configuration in which the second wires 37b are coupled to the first ends of the respective second terminals 52B, that is, the ends facing the first terminals 52A as described in the third or the fourth embodiment.

In the example illustrated in FIG. 28, a terminal 52Aa is provided side by side with the first terminal 52A(3). The first terminal 52A(3) is electrically coupled to the terminal 52Aa via a coupling portion 52Ab. A terminal 52Ba is provided side by side with the second terminal 52B(3). The second terminal 52B(3) is electrically coupled to the terminal 52Ba via a coupling portion 52Bb.

The resistance between the first terminal 52A(3) and the terminal 52Aa is measured by bringing the detection probe 101 into contact with the first terminal 52A(3) and the terminal 52Aa. Similarly, the resistance between the second terminal 52B(3) and the terminal 52Ba is measured. If the resistances are 0, it is determined that the detection probe 101 is brought into contact with the first terminals 52A and the second terminals 52B without any deviation and that the resistance can be correctly measured. Alternatively, contact resistance between the detection probe 101 and the first terminals 52A and contact resistance between the detection prove 101 and the second terminals 52B can be measured.

The first terminals 52A is arranged facing the respective second terminals 52B, and the pairs of the first terminal 52A and the second terminal 52B facing each other are arrayed. This configuration enables the detection of deviation of the detection probe 101 with respect to the first terminals 52A and the second terminals 52B. As illustrated in FIG. 29, the detection probe 101 may possibly be arranged in a manner inclined with respect to the array direction of the first terminals 52A and the second terminals 52B, that is, the first direction Dx.

In this case, the resistances between the first terminal 52A(1) and the second terminal 52B(1), between the first terminal 52A(2) and the second terminal 52B(2), and between the first terminal 52A(3) and the second terminal 52B(3) fail to be detected. By contrast, the resistances between the first terminal 52A(n−1) and the second terminal 52B(n−1) and between the first terminal 52A(n) and the second terminal 52B(n) can be detected. If the resistance fails to be detected from a predetermined number or more of first terminals 52A and second terminals 52B, it is determined that the inclination of the detection probe 101 deviates.

As illustrated in FIG. 30, the resistance inspection is performed on each terminal. In FIGS. 30 and 31, the first terminal 52A(1) and the second terminal 52B(1) are collectively referred to as a "terminal (1)", and the first terminal 52A(n) and the second terminal 52B(n) are collectively referred to as a "terminal (n)", for example. As illustrated in FIG. 30, determination of a resistance inspection result is performed on the terminal (1) (Step ST1). If the resistance falls within a reference value (Yes at Step ST1), the terminal (1) is determined to be "OK", and determination of the next terminal (2) is performed (Step ST2). If the resistance is out of the reference value (No at Step ST1), the detection apparatus 30 is determined not to be a non-defective product ("OUT"), and the resistance inspection is finished. The process described above is repeatedly performed from the terminal (1) to the terminal (n) (Step ST1 to Step STn). If all the terminals are "determined to be OK", the detection apparatus 30 is determined to be a non-defective product in which neither the wires nor the detection electrodes TDL are broken ("OK"), and the inspection is finished.

As illustrated in the table in FIG. 31, for example, the resistance inspection is to perform determination on the upper limit (kΩ) of the resistance and ΔR in the terminals. "ΔR" indicates difference between the resistance of the terminal (n) and the resistance of the terminal (n+1), for example. As illustrated in FIG. 31, ΔR of the terminal (1) is expressed by $\Delta R = a_1 - a_2$ where $a_1$ is the upper limit of the terminal (1), and $a_2$ is the upper limit of the terminal (2) in a standard. As described above, the distances from the respective detection electrodes TDL to the terminal (1), . . . , and the terminal (n) are different, whereby the upper limits and ΔR of the respective terminals are different. These standard values ($a_1, a_2, \ldots, a_n$, and $b_1, b_2, b_n$) are stored in a resistance inspection apparatus in advance. The resistance inspection apparatus compares the standard values with actual values ($c_1, c_2, \ldots, c_n$, and $d_1, d_2, \ldots, d_n$), thereby performing determination on the respective terminals. As illustrated in the table, determination is performed on the upper limits and ΔR of the terminal (1) to the terminal (n).

In the example illustrated in FIG. 30, if any one of the terminals is determined to be NG, the measurement is finished. The present invention is not limited thereto. As illustrated in FIG. 31, the tendency of "OK" and "NG" may be checked after the determination is performed on all the terminals. In the example illustrated in FIG. 31, both of the upper limit and ΔR of the terminal (1) are "OK". The upper limit of the terminal (2) is "OK", but ΔR thereof is "NG". The upper limit of the terminal (n) is "NG", but ΔR thereof is "OK".

Figure 32:
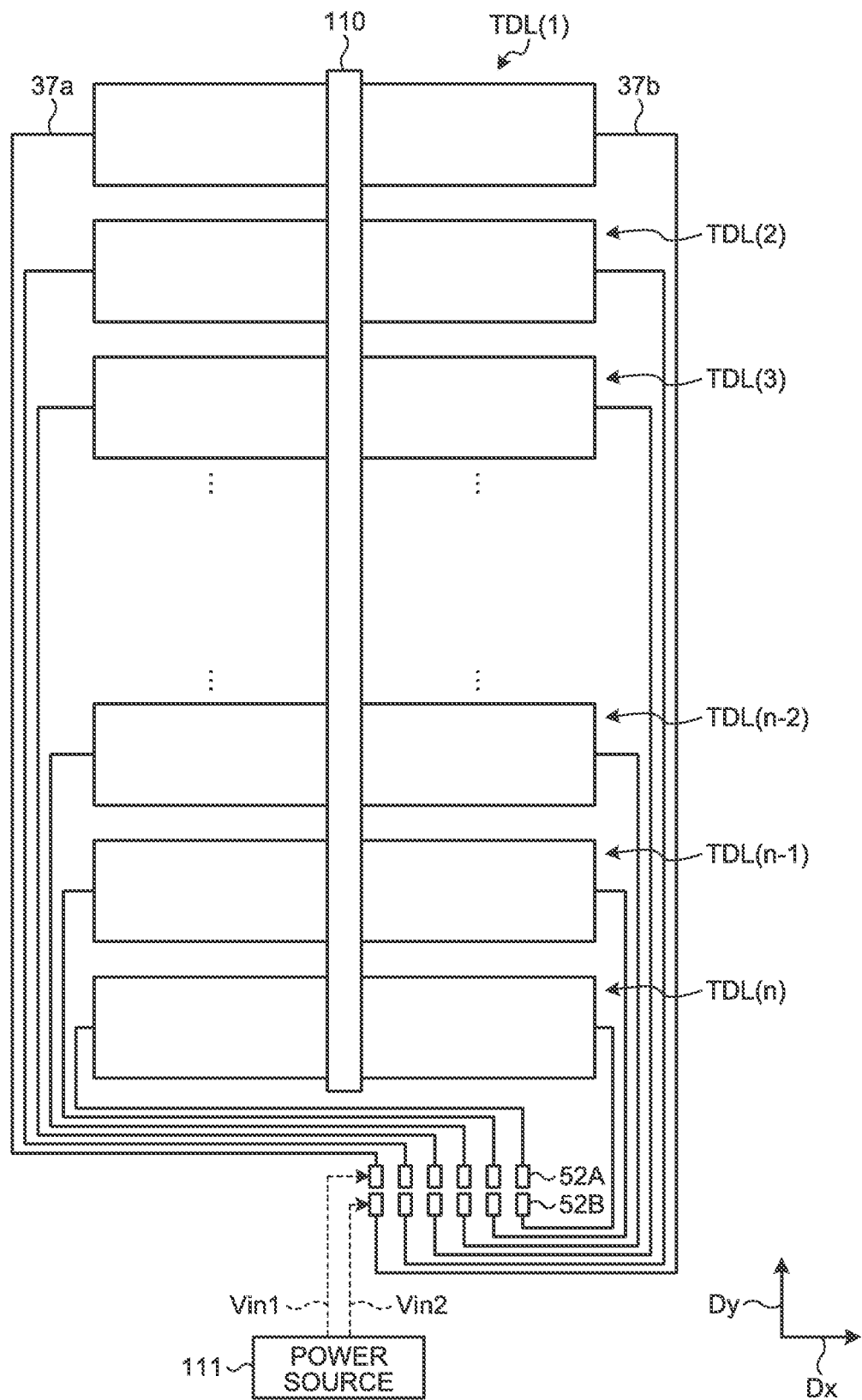
FIG. 32 is a plan view for explaining a second example of the resistance inspection method.
Figure 33:
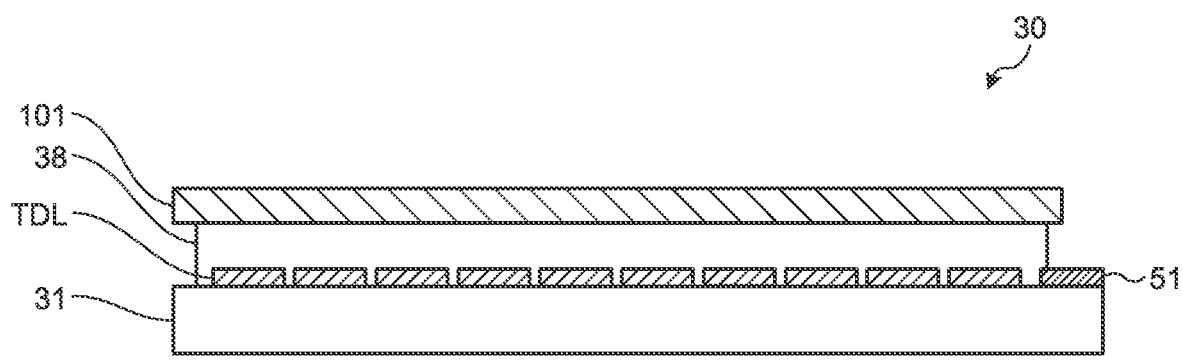
FIG. 33 is a sectional view for explaining the second example of the resistance inspection method.

FIG. 32 is a plan view for explaining a second example of the resistance inspection method. FIG. 33 is a sectional view for explaining the second example of the resistance inspection method. In the example illustrated in FIGS. 28 to 31, the resistance inspection apparatus detects the total of resistances of the first wire 37a, the detection electrode TDL, and the second wire 37b to determine whether the terminal is OK or NG. In the present modification, a non-contact probe 110 is used to detect whether a failure, such as breaking, occurs at any point in the first wires 37a and the second wires 37b.

The non-contact probe 110 detects the voltage value or the current value of the detection electrodes TDL based on a change in capacitance generated between the non-contact probe 110 and the detection electrodes TDL. As illustrated in FIG. 33, the non-contact probe 110 is arranged above the detection electrodes TDL in a non-contact manner with the protective layer 38 interposed therebetween. As illustrated in FIG. 32, the non-contact probe 110 is preferably arranged at the center of the detection electrodes TDL in the first direction Dx. This arrangement can reduce errors between the detection values of the first wires 37a and the detection values of the second wires 37b, thereby performing accurate detection. The non-contact probe 110 is arranged above the detection electrodes TDL arrayed in the second direction Dy.

As illustrated in FIG. 32, the resistance inspection apparatus compares detection signals detected by the non-contact probe 110 between a case where an input signal Vin1 is transmitted from a power source 111 to the first terminal 52A and a case where an input signal Vin2 is transmitted to the second terminal 52B. As a result, the resistance inspection apparatus can detect the position of breaking. If any one of the second wires 37b is broken, for example, the non-contact probe 110 detects no detection signal in response to the input signal Vin2.

Alternatively, the non-contact probe 110 may be moved in a state where a predetermined input signal is received to identify the position of breaking based on a change in the detection signals.

The resistance inspection methods described above are given by way of example only. Other inspection items may be added, and the inspection method may be appropriately changed.

While exemplary embodiments according to the present invention have been described, the embodiments are not intended to limit the invention. The contents disclosed in the embodiments are given by way of example only, and various modifications may be made without departing from the spirit of the invention. Appropriate changes made without departing from the spirit of the invention naturally fall within the scope of the invention. At least one of various omissions, substitutions, and changes of the components may be made without departing from the spirit of the embodiments above and the modifications thereof.

The configurations according to the modifications of the first embodiment, for example, may include the first terminals and the second terminals as described in the second to the fourth embodiments. In the configurations according to the third and the fourth embodiments, the first wire and the second wire may be coupled to one terminal. The shape and the size of the terminals are given by way of example only and may be appropriately changed. While the embodiments have described the detection electrodes TDL, the first wire and the second wire may be coupled to one drive electrode COML and to one terminal. Alternatively, the first wire coupled to a drive electrode COML may be coupled to the first terminal, and the second wire coupled to the drive electrode COML may be coupled to the second terminal.

The detection apparatus and the display apparatus according to the present disclosure may have the following aspects, for example.

(1) A detection apparatus includes a substrate, a display area, a peripheral area provided outside the display area, a plurality of electrodes provided to the display area and on a surface of the substrate, a plurality of terminals provided in correspondence with the respective electrodes in the peripheral area, a first wire that couples a respective electrode of the electrodes to a respective terminal of the terminals, and a second wire that couples the respective electrode to the respective terminal to which the first wire is coupled.

(2) In the detection apparatus according to (1), the plurality of electrodes extend in a first direction and arrayed in a second direction intersecting with the first direction, the plurality of terminals are arrayed in the first direction, the first wire couples a first end of the respective electrode to a first end of the respective terminal in the second direction, and the second wire couples a second end of the respective electrode to a second end of the respective terminal.

(3) In the detection apparatus according to (2), the plurality of terminals have different lengths in the second direction.

(4) In the detection apparatus according to (2) or (3), the plurality of terminals have different lengths in the first direction.

(5) In the detection apparatus according to (1) or (2), the first wire and the second wire are coupled to at least the electrode positioned farthest from the terminal out of the electrodes.

(6) A detection apparatus includes a substrate, a display area, a peripheral area provided outside the display area, a plurality of electrodes provided to the display area and on a surface of the substrate, first terminals and second terminals provided in correspondence with the respective electrodes in the peripheral area, a first wire that couples a respective electrode of the plurality of electrodes to one of the first terminals, and a second wire that couples the respective electrode to one of the second terminals. The first terminals are arrayed in a first direction, and the second terminals are arranged facing the first terminals in a second direction intersecting with the first direction.

(7) In the detection apparatus according to (6), the plurality of electrodes extend in the first direction and the plurality of electrodes are arrayed in the second direction intersecting with the first direction.

(8) In the detection apparatus according to (6) or (7), the first terminal and the second terminal are electrically coupled with a multilayered conductive layer.

(9) In the detection apparatus according to (6) to (8), the first terminal and the second terminal are electrically coupled to a coupling terminal of a flexible substrate.

(10) In the detection apparatus according to (6) to (9), the first wire couples a first end of the respective electrode to the first terminal, and the second wire couples a second end of the respective electrode to the second terminal.

(11) In the detection apparatus according to (6) to (9), the first wire and the second wire are coupled to one end of the respective electrode.

(12) In the detection apparatus according to (11), the second wire passes through a gap between the arrayed first terminals and is coupled to the second terminal.

(13) In the detection apparatus according to (11) or (12), the first wire is provided along the second wire in the peripheral area.

(14) In the detection apparatus according to (2) or (6), the plurality of electrodes each include a first electrode and a second electrode, the first electrode extends in the first direction and is coupled to the first wire at a first end, and the second electrode extends along the first wire and is coupled to the second wire at a second end.

(15) In the detection apparatus according to (14), the first electrodes and the second electrodes are provided in the second direction. The detection apparatus includes a first coupling wire that couples the first electrodes to the first wire, and a second coupling wire that couples the second electrodes to the second wire.

(16) In the detection apparatus according to (1) or (6), the plurality of electrodes are arrayed in the first direction and each provided along the second direction intersecting with the first direction, the plurality of electrodes each include a first electrode and a second electrode, the first electrode and the second electrode are provided along the second direction side by side and electrically coupled at a first end, the first wire is coupled to a second end of the first electrode, and the second wire is coupled to a second end of the second electrode.

(17) The detection apparatus according to any one of (1) to (16) further includes a dummy electrode provided between the electrodes adjacent to each other with a gap interposed between the electrodes and the dummy electrode, the dummy electrode being not electrically coupled to the electrodes, the first wire, or the second wire.

(18) In the detection apparatus according to any one of (1) to (17), the electrodes each include a first conductive thin wire and a second conductive thin wire extending in different directions.

(19) A display apparatus includes the detection apparatus according to any one of (1) to (18) and a display functional layer that displays a$_n$ image on the display area.

The detection apparatus and the display apparatus according to the present disclosure may further have the following aspect.

(20) In the detection apparatus according to (1), the electrodes are arrayed in a matrix, and the first wires and the second wires are coupled to the respective electrodes.

What is claimed is:
1. A detection apparatus comprising:
a substrate;
a detection area;
a peripheral area arranged outside the detection area; and
a plurality of electrodes arranged in the detection area and on a surface of the substrate,
wherein the electrodes each include:
a first electrode that extends in a first direction, and that has a first end and a second end; and
a second electrode that extends in the first direction, and that has a third end and a fourth end,
wherein the first end and the third end are located at one end of the detection area, and the second end and the fourth end are located at the other end of the detection area,
wherein the second end is coupled to the fourth end via a coupling portion,
wherein the first end is coupled to a first terminal and the third end is coupled to a second terminal, and
wherein the first terminal and the second terminal are arranged side by side in the first direction.

2. The detection apparatus according to claim 1,
wherein the first terminal is one of a plurality of first terminals, and the second terminal is one of a plurality of second terminals,
wherein the first terminals are arranged in a second direction crossing the first direction, and
wherein the second terminals are arranged in the second direction.

3. The detection apparatus according to claim 1, wherein the first terminal and the second terminal are electrically coupled with a multilayered conductive layer.

4. The detection apparatus according to claim 1, wherein the first terminal and the second terminal are electrically coupled to a coupling terminal of a flexible substrate.

5. The detection apparatus according to claim 1,
wherein the first end and the first terminal are coupled to each other via a first wire, and
wherein the third end and the second terminal are coupled to each other via a second wire.

6. The detection apparatus according to claim 5,
wherein the first terminal is one of a plurality of first terminals, and the second terminal is one of a plurality of second terminals,
wherein the first terminals are arranged in a second direction crossing the first direction,
wherein the second terminals are arranged in the second direction, and
wherein the second wire passes through a gap between the arrayed first terminals and is coupled to one of the second terminals.

7. The detection apparatus according to claim 5, wherein the first wire is provided along the second wire in the peripheral area.

8. The detection apparatus according to claim 1, wherein the first electrode, the second electrode, the coupling portion, the first end, the second end, the third end, and the fourth end each have a mesh pattern.

9. The detection apparatus according to claim 1, further comprising a dummy electrode that has a mesh pattern and that is arranged between the first electrode and the second electrode.

10. A display apparatus comprising:
a substrate;
a display area;
a peripheral area arranged outside the display area; and
a plurality of electrodes arranged in the display area and on a surface of the substrate,
wherein the electrodes each include:
a first electrode that extends in a first direction, and that has a first end and a second end; and
a second electrode that extends in the first direction, and that has a third end and a fourth end,
wherein the first end and the third end are located at one end of the display area, and the second end and the fourth end are located at the other end of the display area, wherein the second end is coupled to the fourth end via a coupling portion, wherein the first end is coupled to a first terminal and the third end is coupled to a second terminal, and wherein the first terminal and the second terminal are arranged side by side in the first direction.

11. The display apparatus according to claim 10, wherein the first terminal is one of a plurality of first terminals, and the second terminal is one of a plurality of second terminals, wherein the first terminals are arranged in a second direction crossing the first direction, and wherein the second terminals are arranged in the second direction.

12. The display apparatus according to claim 10, wherein the first terminal and the second terminal are electrically coupled with a multilayered conductive layer.

13. The display apparatus according to claim 10, wherein the first terminal and the second terminal are electrically coupled to a coupling terminal of a flexible substrate.

14. The display apparatus according to claim 10, wherein the first end and the first terminal are coupled to each other via a first wire, and wherein the third end and the second terminal are coupled to each other via a second wire.

15. The display apparatus according to claim 14, wherein the first terminal is one of a plurality of first terminals, and the second terminal is one of a plurality of second terminals, wherein the first terminals are arranged in a second direction crossing the first direction, wherein the second terminals are arranged in the second direction, and wherein the second wire passes through a gap between the arrayed first terminals and is coupled to one of the second terminals.

16. The display apparatus according to claim 14, wherein the first wire is provided along the second wire in the peripheral area.

17. The display apparatus according to claim 10, wherein the first electrode, the second electrode, the coupling portion, the first end, the second end, the third end, and the fourth end each have a mesh pattern.

18. The display apparatus according to claim 10, further comprising a dummy electrode that has a mesh pattern and that is arranged between the first electrode and the second electrode.

\* \* \* \* \*